United States Patent
Dong et al.

(10) Patent No.: US 9,832,101 B2
(45) Date of Patent: Nov. 28, 2017

(54) METHOD AND APPARATUS FOR NEGOTIATING "KEEP-ALIVE" MESSAGE FREQUENCIES OF APPLICATIONS RUNNING ON A MOBILE STATION

(71) Applicant: INTERDIGITAL PATENT HOLDINGS, INC., Wilmington, DE (US)

(72) Inventors: Lijun Dong, San Diego, CA (US); Michael F. Starsinic, Newtown, PA (US); Zongrui Ding, Portland, OR (US); Chonggang Wang, Princeton, NJ (US); Qing Li, Princeton Junction, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 138 days.

(21) Appl. No.: 14/437,429

(22) PCT Filed: Oct. 22, 2013

(86) PCT No.: PCT/US2013/066187
§ 371 (c)(1),
(2) Date: Apr. 21, 2015

(87) PCT Pub. No.: WO2014/066393
PCT Pub. Date: May 1, 2014

(65) Prior Publication Data
US 2015/0282177 A1    Oct. 1, 2015

Related U.S. Application Data

(60) Provisional application No. 61/716,679, filed on Oct. 22, 2012.

(51) Int. Cl.
*H04L 12/751* (2013.01)
*H04L 29/08* (2006.01)
(Continued)

(52) U.S. Cl.
CPC ........ *H04L 45/026* (2013.01); *H04L 43/0811* (2013.01); *H04L 43/103* (2013.01);
(Continued)

(58) Field of Classification Search
CPC ............. H04W 72/0453; H04L 45/026; H04L 43/103; H04L 43/0811; H04L 67/145;
(Continued)

(56) References Cited

U.S. PATENT DOCUMENTS 6,983,324 B1 *  1/2006  Block ..................... H04L 69/40
                                                          709/204
8,782,222 B2 *  7/2014  Luna ...................... H04L 67/145
                                                          370/311
(Continued)

FOREIGN PATENT DOCUMENTS

CN        102111899 A       6/2011
WO        2008/113417       9/2008

OTHER PUBLICATIONS

Thomson et al.; Hypertext Transfer Protocol (HTTP) Keep-Alive header; Mar. 2012.*

(Continued)

*Primary Examiner* — Tejis Daya
(74) *Attorney, Agent, or Firm* — Volpe and Koenig, P.C.

(57) ABSTRACT

A method and apparatus are described for negotiating "keep-alive" message frequencies of applications running on a wireless transmit/receive unit (WTRU). A node may include a negotiation and synchronization function (NSF) configured to collect information including frequencies of keep-alive messages required by application servers for different applications running on the WTRU, and send a keep-alive message frequency negotiation request message to the application servers to negotiate for a more proper frequency for each application on behalf of the WTRU. The node may
(Continued)

| "KEEP-ALIVE" MESSAGE FREQUENCY (PER MIN) | TIME REQUIRED TO EQUATE TO A FULL HOUR OF WTRU'S BACKLIGHT TURNED ON (HOURS) |
|---|---|
| 1 | 7.53 |
| 2 | 15.06 |
| 3 | 22.59 |
| 4 | 30.12 | further include a buffering and caching function (BCF) configured to cache and buffer application specific attributes including an indication of whether each of the applications needs to send periodic keep-alive messages to an associated application server. The node may be a packet data network gateway, a negotiation and caching gateway, or a serving gateway.

19 Claims, 24 Drawing Sheets

(51) Int. Cl.
  *H04L 12/26* (2006.01)
  *H04W 72/04* (2009.01)
  *H04L 29/06* (2006.01)
  *H04L 12/24* (2006.01)

(52) U.S. Cl.
  CPC ....... *H04L 67/145* (2013.01); *H04W 72/0453* (2013.01); *H04L 41/0893* (2013.01); *H04L 41/5022* (2013.01); *H04L 69/28* (2013.01)

(58) Field of Classification Search
  CPC .. H04L 41/0893; H04L 41/5022; H04L 69/28
  See application file for complete search history.

(56) References Cited

U.S. PATENT DOCUMENTS

| | | | | |
|---|---|---|---|---|
| 8,959,235 | B1* | 2/2015 | Newstadt | H04L 69/28 709/227 |
| 2001/0032267 | A1* | 10/2001 | Collison | H04L 67/16 709/230 |
| 2006/0039295 | A1* | 2/2006 | Sturrock | H04L 47/10 370/252 |
| 2006/0039302 | A1* | 2/2006 | Sturrock | H04L 41/0896 370/282 |
| 2006/0041673 | A1* | 2/2006 | Sturrock | H04L 41/0896 709/230 |
| 2008/0039032 | A1* | 2/2008 | Haumont | H04W 8/22 455/115.1 |
| 2008/0059582 | A1* | 3/2008 | Hartikainen | H04L 67/14 709/204 |
| 2008/0154913 | A1 | 6/2008 | Kohonen | |
| 2010/0142411 | A1* | 6/2010 | Holm | H04L 65/1063 370/259 |
| 2010/0223492 | A1* | 9/2010 | Farrugia | H04L 65/1016 714/4.1 |
| 2010/0312899 | A1* | 12/2010 | Herzog | H04L 67/141 709/228 |
| 2010/0318663 | A1* | 12/2010 | Esteve Balducci | H04L 67/1095 709/227 |
| 2010/0322124 | A1* | 12/2010 | Luoma | H04W 72/1242 370/311 |
| 2011/0131321 | A1* | 6/2011 | Black | G06F 1/3203 709/224 |
| 2011/0185202 | A1* | 7/2011 | Black | H04W 52/0258 713/320 |
| 2012/0173901 | A1* | 7/2012 | Soliman | H04W 88/182 713/320 |
| 2014/0051485 | A1* | 2/2014 | Wang | H04B 7/2656 455/574 |
| 2014/0129731 | A1* | 5/2014 | Copsey | H04L 43/0858 709/233 |

OTHER PUBLICATIONS

China Mobile, "Reducing keep-alive data of applications by network-based always-online solution," SA WG2 Meeting #93, S2-123534, Sofia, Bulgaria (Oct. 8-12, 2012).

Huawei et al., "Use Push Proxy to reduce heartbeat/keep-alive data of Applications," SA WG2 Meeting #93, S2-124171, Sofia, Bulgaria (Oct. 8-12, 2012).

Albanesius, "Apple App Store Tops 300,000 Apps," PCMag.com (Nov. 22, 2010).

Baset et al., "An Analysis of the Skype Peer-to-Peer Internet Telephony Protocol," Proceedings of the IEEE International Conference on Computer Communications, pp. 1-11 (Apr. 2006).

Falaki et al., "A First Look at Traffic on Smartphones," IMC '10, pp. 1-7 (Nov. 1-3, 2010).

Falaki et al., "Diversity in Smartphone Usage," MobiSys'10, pp. 1-16 (Jun. 2010).

Huawei et al., "Push Proxy/Device Agent Function for reducing heartbeat/keep-alive of applications," SA WG2 Meeting #96, S2-131498, San Diego, US (Apr. 8-12, 2013).

Signals Research Group, LLC, "SmartPhones and a 3G Network," pp. 1-62 (May 2010).

Third Generation Partnership Project, "Technical Specification Group Services and System Aspects; Study on non-MTC Mobile Data Applications impacts (Release 11)," 3GPP TR 22.801 V1.0.0 (Sep. 2011).

Third Generation Partnership Project, "Technical Specification Group Services and System Aspects; Study on non-MTC Mobile Data Applications impacts (Release 12)," 3GPP TR 22.801 V12.0.0 (Dec. 2011).

Third Generation Partnership Project, "Technical Specification Group Services and System Aspects; Machine-Type and other Mobile Data Applications Communcations Enhancements (Release 12)," 3GPP TR 23.887 V0.3.0 (Oct. 2012).

Third Generation Partnership Project, "Technical Specification Group Services and System Aspects; Machine-Type and other Mobile Data Applications Communications Enhancements (Release 12)," 3GPP TR 23.887 V0.9.0 (Apr. 2013).

Third Generation Partnership Project, "Technical Specification Group Services and System Aspects; Machine-Type and other mobile data applications Communications enhancements (Release 12)," 3GPP TR 23.887 V1.3.0 (Nov. 2013).

3rd Generation Partnership Project, "Technical Specification Group Services and System Aspects; Architecture enhancements to facilitate communications with packet data networks and applications (Release 11)," 3GPP TS 23.682 V11.2.0 (Sep. 2012).

3rd Generation Partnership Project, "Technical Specification Group Services and System Aspects; Architecture enhancements to facilitate communications with packet data networks and applications (Release 11)," 3GPP TS 23.682 V11.5.0 (Sep. 2013).

3rd Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.16.0 (Mar. 2012).

3rd Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.18.0 (Mar. 2013).

3rd Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.13.0 (Jun. 2012).

3rd Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.15.0 (Mar. 2013).

3rd Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.8.0 (Jun. 2012).

3rd Generation Partnership Project, "Technical Specification Group Services and System Aspects; General Packet Radio Service

(56) References Cited

OTHER PUBLICATIONS (GPRS) enhancements for Evolved Universal Terrestrial Radio Access Network (E-UTRAN) access (Release 10)," 3GPP TS 23.401 V10.10.0 (Mar. 2013).

3rd Generation Partnership Project, "Technical Specification Group Services and System Aspects; General Packet Radio Service (GPRS) enhancements for Evolved Universal Terrestrial Radio Access Network (E-UTRAN) access (Release 11)," 3GPP TS 23.401 V11.3.0 (Sep. 2012).

3rd Generation Partnership Project, "Technical Specification Group Services and System Aspects; General Packet Radio Service (GPRS) enhancements for Evolved Universal Terrestrial Radio Access Network (E-UTRAN) access (Release 11)," 3GPP TS 23.401 V11.7.0 (Sep. 2013).

3rd Generation Partnership Project, "Technical Specification Group Services and System Aspects; General Packet Radio Service (GPRS) enhancements for Evolved Universal Terrestrial Radio Access Network (E-UTRAN) access (Release 12)," 3GPP TS 23.401 V12.2.0 (Sep. 2013).

\* cited by examiner

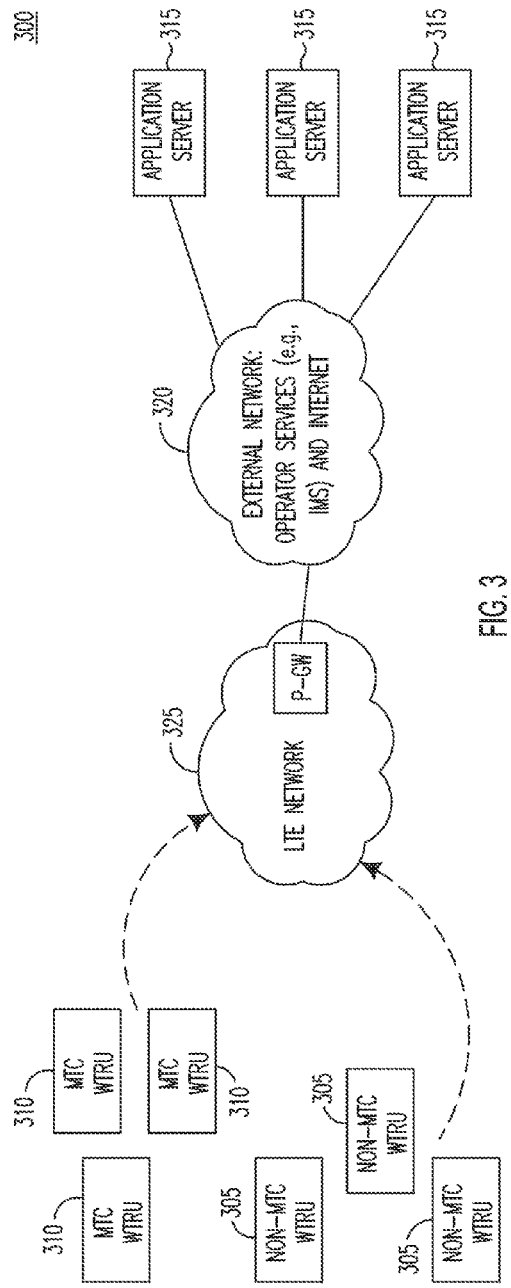

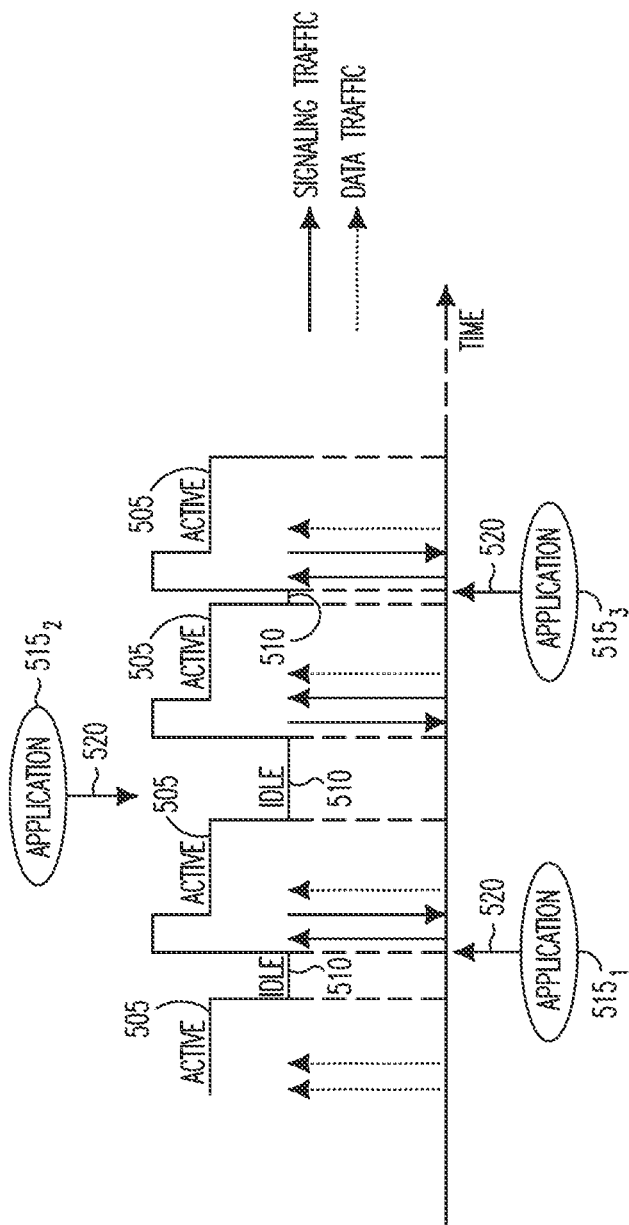

| PROBLEM SCENARIO | EXAMPLE APPLICATIONS THAT CAUSE PROBLEMS | EFFECT TO EPC | EFFECT TO RAN | EFFECT TO WTRU |
|---|---|---|---|---|
| MO STATUS UPDATE | • SOCIAL NETWORK: WTRU OWNER'S STATUS UPDATE<br>• GEO SERVICE APPLICATION: GEO-TAGS, GEO-CAST, ETC. | SIGNALING OVERHEAD (SET-UP & TEAR-DOWN) | RRC SIGNALING OVERHEAD | REDUCED BATTERY LIFE |
| MO PERIODIC KEEP-ALIVE | • VPN<br>• SKYPE WHEN NOT IN A CALL | | | |
| MT STATUS UPDATE | • SOCIAL NETWORK FRIEND'S CONTENT/STATUS UPDATE.<br>• GEO SERVICE APPLICATION: LOCATION-TARGETED EVENT/ADS | SIGNALING OVERHEAD (SET-UP & TEAR-DOWN) | RRC SIGNALING OVERHEAD<br>PAGING SIGNALING OVERHEAD TO TRACKING AREA | REDUCED BATTERY LIFE |
| MO PERIODIC KEEP-ALIVE | SKYPE WHEN NOT IN A CALL | | | |

FIG. 6

| INFORMATION | TYPE | REMARKS |
|---|---|---|
| TIME | SYNCHRONIZED SYSTEM CLOCK | INDICATES WHEN P-GW RECEIVES A MESSAGE ORIGINATED FROM THE WTRU OR TARGETED TO THE WTRU |
| SOURCE | IMSI, MSISDN, EXTERNAL MTC IDENTIFIER, TRANSPORT ADDRESS (IP ADDRESS/PORT ID) ETC. | INDICATES THE SOURCE OF THE MESSAGE. |
| TARGETING OR ORIGINATING APPLICATION ID | TRANSPORT ADDRESS (IP ADDRESS/PORT ID) | INDICATES THE APPLICATION ID THE MESSAGE IS SENT TO OR ORIGINATED FROM. THE APPLICATION ID MAY BE A PORT NUMBER. |
| TYPE | NOT SPECIFIED | INDICATES THE TYPE OF THE MESSAGE, SUCH AS "KEEP-LIVE", STATUS UPDATE, ETC. |
| PRIORITY | NOT SPECIFIED | INDICATES THE PRIORITY OR URGENCY OF THE MESSAGE. |

FIG. 10

| INFORMATION | TYPE | REMARKS |
|---|---|---|
| APPLICATION ID | TRANSPORT ADDRESS (IP ADDRESS/PORT ID) | DENOTES THE IDENTIFIER OF THE APPLICATION. THE APPLICATION ID MAY BE A PORT NUMBER. |
| STATUS | RUNNING/TERMINATED | INDICATES THE CURRENT STATUS OF THE APPLICATION, WHETHER IT IS RUNNING OR TERMINATED. |
| ALWAYS-ON | YES/NO | WHETHER THE ASSOCIATED APPLICATION SERVER NEEDS THE APPLICATION TO PERIODICALLY SEND "KEEP-ALIVE" MESSAGES TO MAINTAIN ITS "ALWAYS-ON" PROPERTY. |
| PRIORITY | NOT SPECIFIED | INDICATES THE PRIORITY OR URGENCY OF THE APPLICATION. |
| REQUIRED FREQUENCY OF "KEEP-ALIVE" MESSAGES FROM APPLICATION SERVER | SECONDS | INDICATES THE FREQUENCY OF THE "KEEP-ALIVE" MESSAGES REQUIRED BY ASSOCIATED APPLICATION SERVER. |
| ACTUAL FREQUENCY OF "KEEP-ALIVE" MESSAGES SENT TO APPLICATION SERVER | SECONDS | INDICATES THE ACTUAL FREQUENCY OF THE "KEEP-ALIVE" MESSAGES SENT BY THE APPLICATION. |
| NUMBER OF VIRTUAL "KEEP-ALIVE" MESSAGES SENT BY P-GW | NOT SPECIFIED | INDICATES THE NUMBER OF VIRTUAL "KEEP-ALIVE" MESSAGES THAT NEED TO BE SENT BY P-GW BEFORE THE NEXT REAL "KEEP-ALIVE" MESSAGE FROM THE APPLICATION ARRIVES. |
| ASSOCIATED APPLICATION SERVER | TRANSPORT ADDRESS (IP ADDRESS/PORT ID) | INDICATES THE ADDRESS OF THE APPLICATION SERVER. |
| LATEST "KEEP-ALIVE" MESSAGE | NOT SPECIFIED | CACHES THE LATEST "KEEP-ALIVE" MESSAGE THAT IS SENT FROM THE APPLICATION. |
| EXTENDED DRX INFORMATION | TIME | IF THE WTRU SUPPORTS AN EXTENDED DRX CYCLE, THIS FIELD CAN BE USED TO INDICATE AT WHAT TIMES THE WTRU IS AVAILABLE TO RECEIVE MESSAGES. |

| APPLICATION (APP) ID | "KEEP-ALIVE" MESSAGE FREQUENCY (SEC) | APPLICATION SERVER (AS) ADDRESS |
|---|---|---|
| APP1 | 10 | AS1 |
| APP2 | 40 | AS2 |
| APP3 | 20 | AS3 |
| ... | ... | ... |
| APPn | 60 | ASn |

| MESSAGE ID (1305) | WTRU ID (1310) | NR OF APPS (1315) | APP ID 1 (1320₁) | FREQUENCY 1 (1325₁) | APP ID 2 (1320₂) | FREQUENCY 2 (1325₂) | ... | APP ID N (1320ₙ) | FREQUENCY N (1325ₙ) | PROPOSED FREQUENCY (1330) |

| MESSAGE ID (1405) | APP ID (1410) | CODE (1415) | FREQUENCY (1420) | PROPOSED FREQUENCY RANGE (1425) |

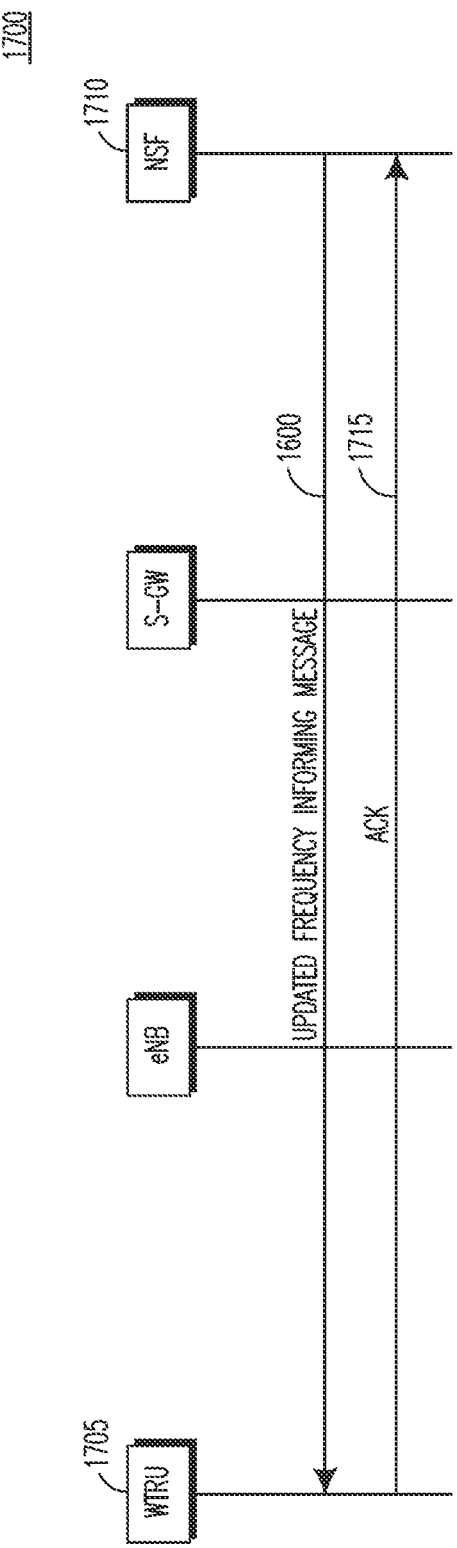

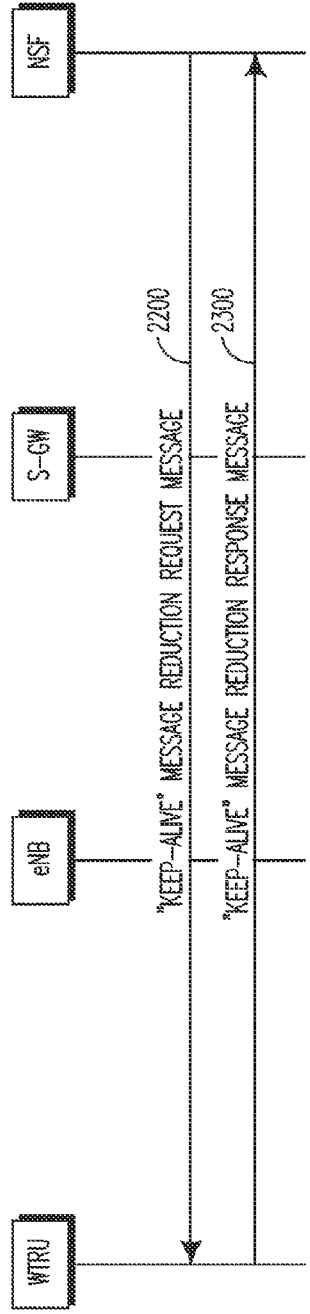

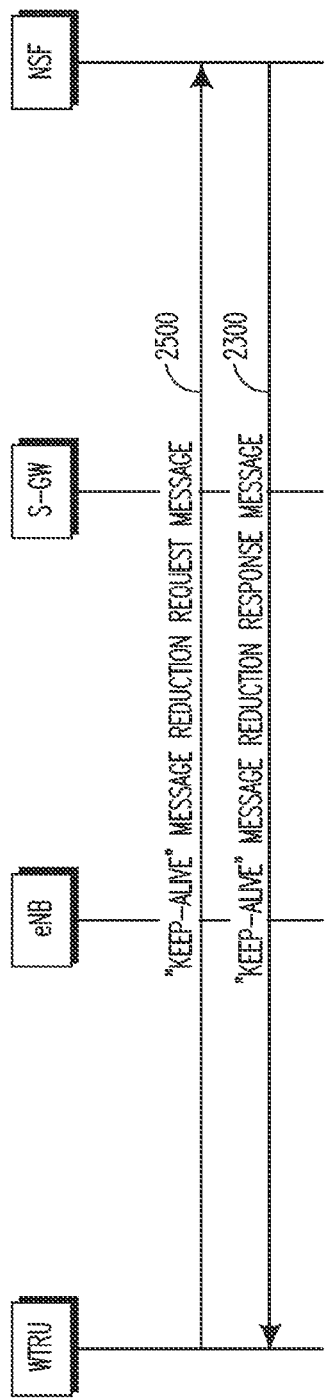

METHOD AND APPARATUS FOR NEGOTIATING "KEEP-ALIVE" MESSAGE FREQUENCIES OF APPLICATIONS RUNNING ON A MOBILE STATION

CROSS REFERENCE TO RELATED APPLICATION

This application claims the benefit of PCT Application No. PCT/US2013/066187, filed Oct. 22, 2013, and U.S. Provisional Application Ser. No. 61/716,679 filed Oct. 22, 2012, the contents of which are incorporated herein by reference in their entirety.

BACKGROUND

Today, there exist hundreds of thousands of mobile data applications for mobile devices, including machine type communication (MTC) applications and non-MTC applications. Many of these applications may utilize mobile broadband connections to provide various types of communications to users of wireless transmit/receive units (WTRUs), (i.e., mobile stations).

Some existing "always on" mobile data applications, such as instant messaging (IM), social networking applications, alarm and surveillance systems, and the like, are currently bringing challenges to operator networks. In general, a mobile data application running on a WTRU may involve interactive communications, through an operator network, with an application server (AS) located in the Internet.

The AS and the mobile data application may periodically exchange "heartbeat" messages, (also known as "keep-alive" messages), to keep the application session alive and also to avoid the expiration of a network address translation (NAT) mapping, which may cause an ongoing Internet protocol (IP) session to disconnect. In addition to periodic keep-alive messages, an application may also generate frequent status update messages to notify a WTRU user regarding status updates associated with the application, (e.g., presence information of buddies in an instant messaging (IM) buddy list, updates of user location upon user "check in", updates of "Facebook likes" to the WTRU user's friends, and the like).

However, these keep-alive messages and status update messages associated with different applications running on numerous WTRUs may take a considerable toll on the battery life of these WTRUs. Further, considerable signaling traffic congestion in the core network may occur due to these messages.

SUMMARY

A method and apparatus are described for negotiating "keep-alive" message frequencies of applications running on a wireless transmit/receive unit (WTRU). A node may include a negotiation and synchronization function (NSF) configured to collect information including frequencies of keep-alive messages required by application servers for different applications running on the WTRU, and send a keep-alive message frequency negotiation request message to the application servers to negotiate for a more proper frequency for each application on behalf of the WTRU. The node may further include a buffering and caching function (BCF) configured to cache and buffer application specific attributes including an indication of whether each of the applications needs to send periodic keep-alive messages to an associated application server. The node may be a packet data network gateway, a negotiation and caching gateway, or a serving gateway.

BRIEF DESCRIPTION OF THE DRAWINGS

A more detailed understanding may be had from the following description, given by way of example in conjunction with the accompanying drawings wherein:

FIG. 3 shows an example of a general architecture of non-machine type communication (non-MTC) and MTC applications;

FIG. 4 shows an example of the impact of keep-alive messages on battery life;

FIG. 5 shows an example of timing when a WTRU experiences a frequent idle-active state transition problem;

FIG. 6 shows an example of signaling inefficiency and reduced battery life caused by mobile data application status updates and keep-alive messages;

FIG. 10 shows an example of attributes of messages forwarded by a P-GW originated from a WTRU or targeted to a WTRU;

FIG. 11 shows an example of information of an application on a WTRU;

FIG. 12 shows an example of information that may be useful for the NSF to perform negotiation;

FIG. 13 shows an example of a keep-alive message frequency negotiation request message;

FIG. 14 shows an example of a keep-alive message frequency negotiation response message;

FIG. 16 shows an example of an updated frequency informing message;

FIG. 17 shows an example of an updated frequency informing procedure;

FIG. 22 shows an example of an MO keep-alive message reduction request message sent by an NSF;

FIG. 23 shows an example of an MO keep-alive message reduction response message sent by a WTRU;

FIG. 24 shows an example message flow of an MO keep-alive message reduction procedure initiated by an NSF;

FIG. 25 shows an example of an MO keep-alive message reduction request message sent by a WTRU; and FIG. 26 shows an example message flow of an MO keep-alive message reduction procedure initiated by a WTRU.

DETAILED DESCRIPTION

Figure 1A:
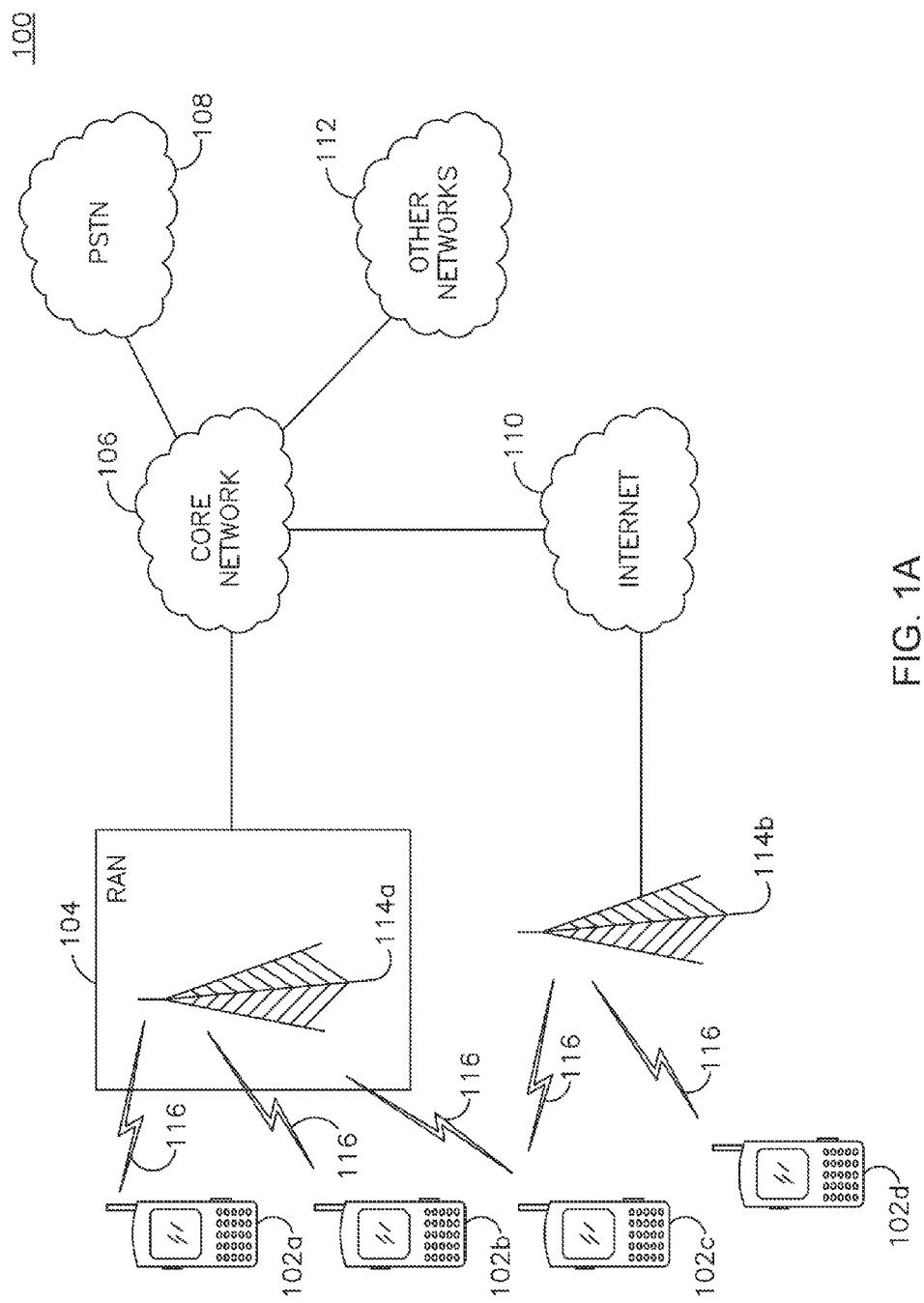
FIG. 1A shows an example communications system in which one or more disclosed embodiments may be implemented.

FIG. 1A shows an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 11.4b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a Node-B, an evolved Node-B (eNB), a Home Node-B (HNB), a Home eNB (HeNB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link, (e.g., radio frequency (RF), microwave, infrared (IR), ultraviolet (UV), visible light, and the like). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed downlink packet access (HSDPA) and/or high-speed uplink packet access (HSUPA).

In another embodiment, the base station 114a and the WTRUs 102a, 102b, 102c may implement a radio technology such as evolved UTRA (E-UTRA), which may establish the air interface 116 using long term evolution (LTE) and/or LTE-Advanced (LTE-A).

In other embodiments, the base station 114a and the WTRUs 102a, 102b, 102c may implement radio technologies such as IEEE 802.16 (i.e., worldwide interoperability for microwave access (WiMAX)), CDMA2000, CDMA2000 1x, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

The base station 114b in FIG. 1A may be a wireless router, HNB, HeNB, or AP, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT, (e.g., WCDMA, CDMA2000, GSM, LTE, LTE-A, and the like), to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over Internet protocol (VoIP) services to one or more of the WTRUs 102a, 102b, 102c, 102d. For example, the CN 106 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing an E-UTRA radio technology, the CN 106 may also be in communication with another RAN (not shown) employing a GSM radio technology.

The CN 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP suite. The networks 112 may include wired or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
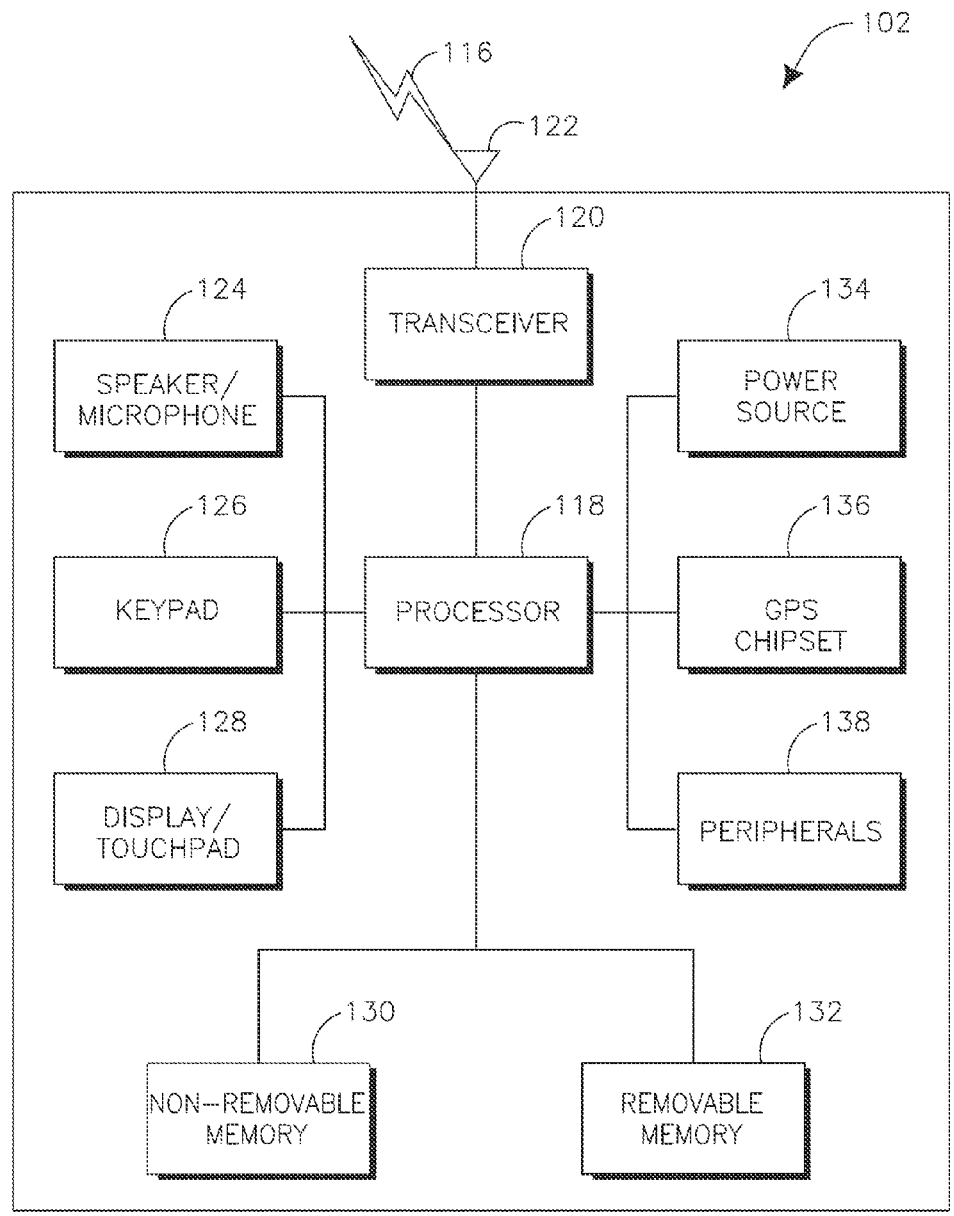
FIG. 1B shows an example wireless transmit/receive unit (WTRU) that may be used within the communications system shown in FIG. 1A.

FIG. 1B shows an example WTRU 102 that may be used within the communications system 100 shown in FIG. 1A. As shown in FIG. 1B, the WTRU 102 may include a processor 118, a transceiver 120, a transmit/receive element, (e.g., an antenna), 122, a speaker/microphone 124, a keypad 126, a display/touchpad 128, a non-removable memory 130, a removable memory 132, a power source 134, a global positioning system (GPS) chipset 136, and peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. The transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122, (e.g., multiple antennas), for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station, (e.g., base stations 114a, 114b), and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
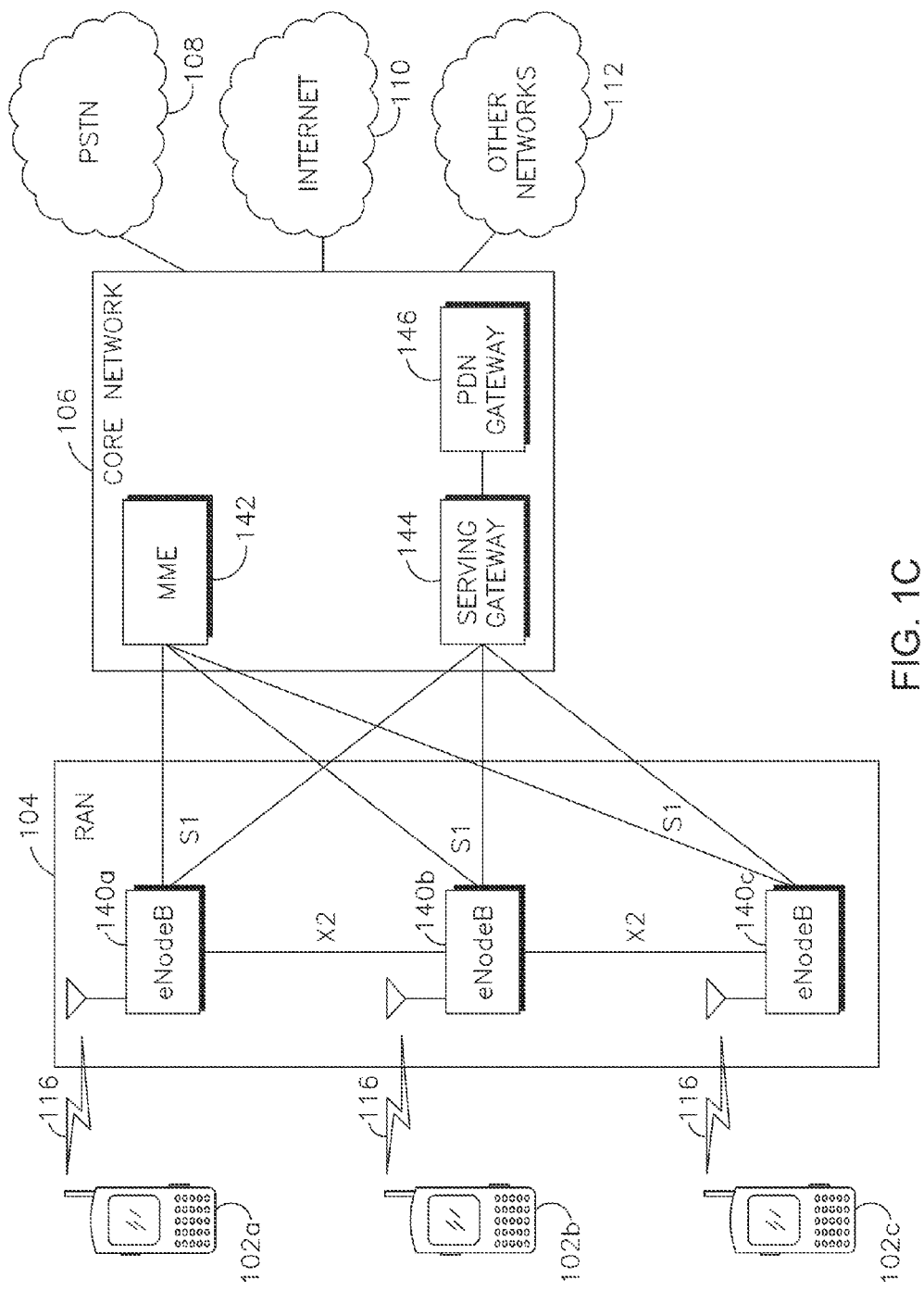
FIG. 1C shows an example radio access network and an example core network (CN) that may be used within the communications system shown in FIG. 1A.

FIG. 1C shows an example RAN 104 and an example CN 106 that may be used within the communications system 100 shown in FIG. 1A. As noted above, the RAN 104 may employ an E-UTRA radio technology to communicate with the WTRUs 102a, 102b, 102c over the air interface 116. The RAN 104 may also be in communication with the CN 106.

The RAN 104 may include eNBs 140a, 140b, 140c, though it will be appreciated that the RAN 104 may include any number of eNBs while remaining consistent with an embodiment. The eNBs 140a, 140b, 140c may each include one or more transceivers for communicating with the WTRUs 102a, 102b, 102c over the air interface 116. In one embodiment, the eNBs 140a, 140b, 140c may implement MIMO technology. Thus, the eNB 140a, for example, may use multiple antennas to transmit wireless signals to, and receive wireless signals from, the WTRU 102a.

Each of the eNBs 140a, 140b, 140c may be associated with a particular cell (not shown) and may be configured to handle radio resource management decisions, handover decisions, scheduling of users in the uplink and/or downlink, and the like. As shown in FIG. 1C, the eNBs 140a, 140b, 140c may communicate with one another over an X2 interface.

The CN 106 shown in FIG. 1C may include a mobility management entity (MME) 142, a serving gateway 144, and a packet data network (PDN) gateway 146. While each of the foregoing elements are depicted as part of the CN 106, it will be appreciated that any one of these elements may be owned and/or operated by an entity other than the CN operator.

The MME 142 may be connected to each of the eNBs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNBs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNB handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway, (e.g., an IP multimedia subsystem (IMS) server), that serves as an interface between the CN 106 and the PSTN 108. In addition, the CN 106 may provide the WTRUs 102a, 102b, 102c with access to the networks 112, which may include other wired or wireless networks that are owned and/or operated by other service providers.

LTE networks may be the next generation of the deployed third generation partnership project (3GPP) networks. The concepts described herein are not limited to LTE networks, but may be applicable to other 3GPP networks such as UMTS, GSM, CDMA2000, and the like.

Figure 2:
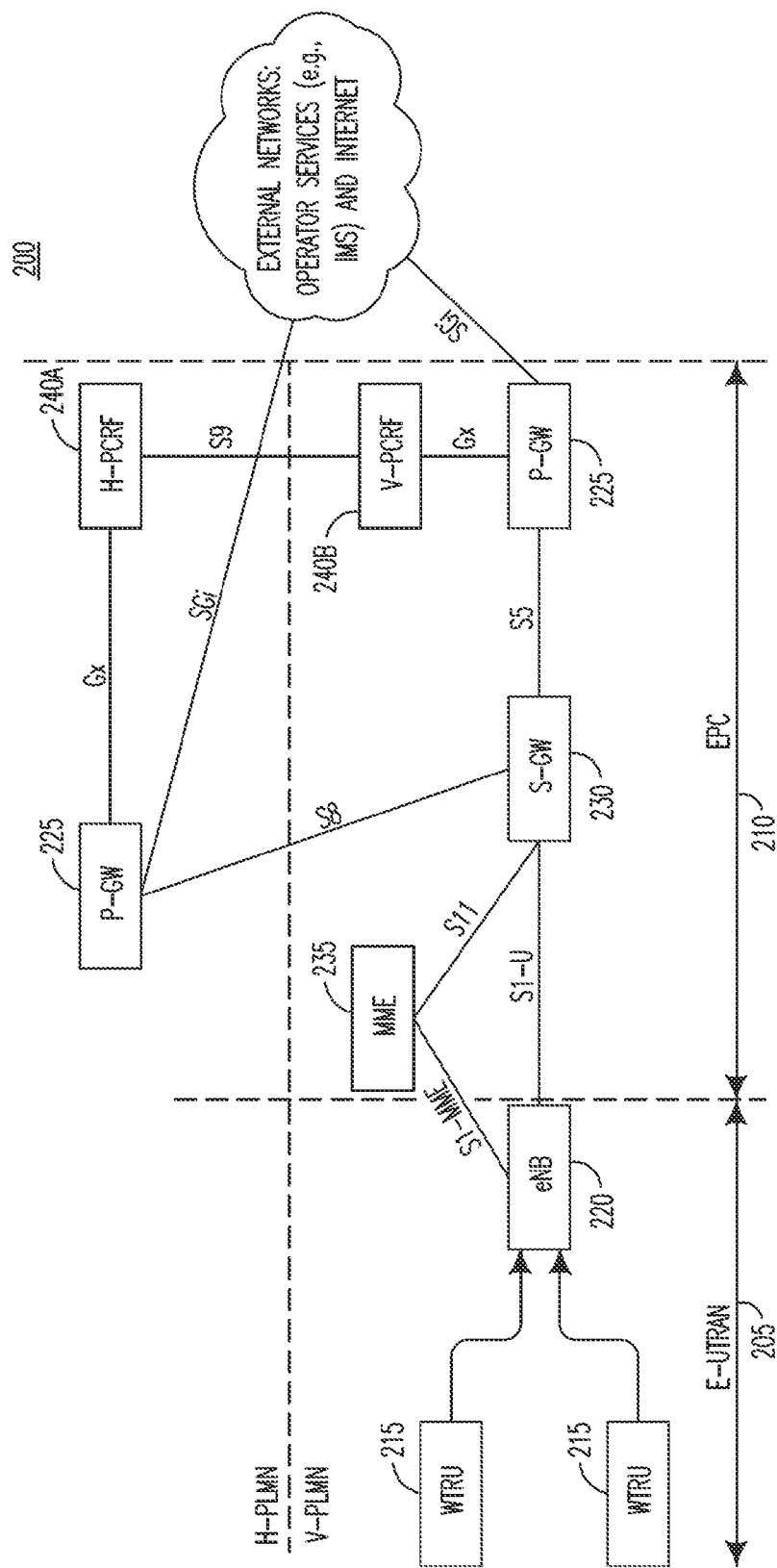
FIG. 2 shows an example of a long term evolution (LTE) global architecture.

FIG. 2 shows an example of a global architecture of an LTE network 200, including an evolved UMTS terrestrial radio access network (E-UTRAN) 205 and an evolved packet core (EPC) network 210. The E-UTRAN 205 may include a plurality of WTRUs 215 and an evolved Node-B (eNB) 220. The eNBs 220 may be base stations that integrate functionalities such as radio management. The EPC network 210 may serve as the CN portion of the LTE network 200. It may be responsible for the overall control of the WTRUs 215 and the establishment of bearers between the WTRUs 215 and a PDN gateway (P-GW) 225. A bearer may be a packet flow or tunnel between a WTRU 215 and the P-GW 225.

The P-GW 225 in the EPC network 210 may be configured to insure the connection with the IP network of an operator. The P-GW 225 may be responsible for allocating IP addresses for the WTRUs 215. The P-GW 225 may also filter downlink packets into bearers of different quality of services (QoS) and destinations (WTRUs).

The EPC network 210 may include a serving gateway (S-GW) 230 that may serve as an anchor for data bearers when a WTRU 215 moves from the eNB 220 to another eNB (handover). The S-GW 230 may also hold data of downlink bearers when a WTRU 215 is in an idle state, (i.e., turned off to save power, to release the radio bandwidth it uses for other WTRUs), and while a mobility management entity (MME) 235 re-establishes the bearer with the WTRU 215.

The MME 235 may serve as a key element in the LTE architecture 200, since it may be responsible for processing signaling between a WTRU 215 and the EPC network 210. The MME 235 may carryout functions related to bearer management, (establishment, maintenance and release), and functions related to attachment and connection management, (establishment of the connection and security between the EPC network 210 and the WTRU 215, authentication). The MME 235 may help to reduce the overhead in the radio network by holding information about the WTRUs 215, which may ensure continuity when the WTRUs 215 are in an idle state. These functions may be handled by a session management layer in the non-access stratum (NAS) protocol.

A policy control and charging rules function (PCRF) 240A and 240B may be responsible for policy control decision making and the management of the flow based charging functionalities in a policy control enforcement function (PCEF). The PCEF may reside in the P-GW 225 and may provide QoS information, (QoS class identifier (QCI) and bit rates), that determines how a certain data flow may be treated in the PCEF (by the P-GW 225) and may ensure that this is in accordance with the user's subscription profile.

While some of the non-MTC applications running on WTRUs, which normally involve human interactions, may focus on more "traditional" use cases, such as web browsing or email reading, other emerging applications such as social networking applications may help the users to "stay connected" with their friends on the go. Different categories of mobile non-MTC data applications may include Web browsing, Email, weather/news updates, voice over IP (VoIP), (e.g., Skype and the like), social networking (Facebook), Geo services (Google places/location-targeted ads), online games and messaging (short message service (SMS) and instant messaging).

MTC applications may be automated machine or device communications that do not necessarily need human interaction. MTC applications may be used today in almost any everyday life application ranging from military to civil applications, such as security: alarm system, car/driver security; tracking & tracing: fleet management, order management, navigation, traffic optimization/steering; payment: point of sales, gaming machines; health care: monitoring vital signs, remote diagnostics; remote maintenance/control: sensors, lighting, pumps, elevator control; metering: power, gas, water, grid control. Those MTC applications are generally distributed over a wide area through widely deployed networks, such as the LTE network.

FIG. 3 shows a general architecture 300 of non-MTC applications and MTC applications running on non-MTC WTRUs 305 and MTC WTRUs 310, which may communicate with one of a plurality of application servers (AS's) 315 residing in an external network 320 through an LTE network 325.

In addition to the network connections that a subscriber may originate and may be aware of, there may also be the presence of so-called keep-alive messages, which may occur without the subscriber's knowledge, both for the non-MTC WTRUs 305 and MTC WTRUs 310. For MTC WTRUs 310, some of the applications that support an alarm system, elevator control and vital sign monitoring, may need to inform an AS 315 that the MTC WTRUs 310 are alive and reachable. For non-MTC WTRUs 305, keep-alive messages may be used to provide an update on the user's (i.e., subscriber's) status, (e.g., "where am I located", "am I available to respond to an IM message", and the like). These keep-alive messages may be constantly sent by the non-MTC WTRUs 305 as long as the applications are active, even when the non-MTC WTRUs are seemingly not being used. The keep-alive messages may generate very little in the way of data traffic, although they may generate a tremendous amount of signaling traffic while also impacting the expected battery life of the non-MTC WTRUs. Thus, the amount of signaling traffic required to set send a keep-alive message may be no different than the amount of signaling traffic required to set up a data session in which meaningful amounts of data are sent. Hereinafter, non-MTC WTRUs and MTC WTRUs are simply referred to as WTRUs.

FIG. 4 shows an example of how much keep-alive messages drain a phone's battery. FIG. 4 shows the impact of keep-alive messages by comparing varying frequencies to the amount time that the backlight on the WTRU is turned on for one full hour. For example, as shown in FIG. 4, a frequency of one keep-alive message every minute over 7.53 hours (almost a full eight (8) hour work day) may require more energy than what is required to keep the backlight of the WTRU on for 60 minutes (one (1) full hour).

The frequency of keep-alive messages may pose a problem due to excessive battery drainage. VoIP applications such as Skype and Fring may generate keep-alive messages from once every 30 seconds to every 8 minutes. The frequency of status update messages may pose a similar problem. Social networking applications such as FindMe may generate status update messages upon geographic position changes. The frequency of such messages may range from sporadic over a day, (e.g., changing from home to work to gym then back to home), to periodic up to every 60 seconds. Social networking servers may push content and presence update messages of the subscriber's friends to the applications on the WTRU, (e.g., Facebook may post the activities when your friend "likes" a particular article or "becomes a fan" of a particular group). The frequency of such content and presence update messages may be estimated on the order of every few minutes.

One aspect that may aggravate the impact of status update and keep-alive messages is that these messages may be mobile-originated (MO) or mobile-terminated (MT), e.g., periodic FindMe messages, may come from change of location of friends, or from the updates of a WTRU user's own location. Another aspect is that it is common for multiple applications to be installed into a single WTRU, where each application may generate these update/keep-alive messages autonomously.

When the transmission of keep-alive or status update messages are completed, and upon detection of user inactivity, the WTRU may be moved to a low power state, (e.g., from connected state to idle state), in order to save the WTRU's battery power. As a result, when the average frequency of status update and/or keep-alive messages is greater than the inactivity timer, the WTRU may have to cycle among idle, wakeup, re-establish the connection, send or receive the update message(s), go back to idle and so on.

FIG. 5 shows an example of timing when a WTRU experiences a frequent idle-active state transition problem. As shown in FIG. 5 (from left to right), after a WTRU completes processing some data traffic, it may stay in an active state 505 for a while and then transition to an idle state 510 to conserve battery power. Soon after the WTRU enters idle state 510, a first application 515₁ may generate an update message 520, causing the WTRU to wake up and transmit and receive some signaling messages to establish a connection. The WTRU may consume more energy in sending and receiving signaling messages than when it is in an active state 505 but sending no message. After establishing the connection, the WTRU may send the update message 520 and again stay in active state 505 for a while before going to idle state 510. This cycle repeats as other applications also send/receive update messages 520, (e.g., some MT update messages may be pushed by a second application 515₂ and some MO update messages may be generated by a third application 515₃).

When the WTRU constantly flips between active state and idle state, there are two problems that may be observed. The first problem may be increased control plane signaling, where there is excessive signaling overhead, (both in the RAN and in the CN), to send these occasional, very small update messages. To send just one update message, it may take one round of idle-active transitions, which may incur significant signaling overhead, including multiple radio resource control (RRC) messages in the RAN, (e.g., service request, radio bearer establishment/release, and paging when the message is an MT message), and EPC signaling messages, (e.g., service request, connection setup/release). The second problem may be reduced battery life of the WTRU. In the worst case scenario, when multiple applications 515 generate update messages soon after the WTRU enters an idle state 510, the energy consumption of the WTRU may increase due to the extra signaling that may be generated by constantly flipping between active state 505 and idle state 510, power consumption may be better if the WTRU remained in active state 505.

FIG. 6 summarizes the problem scenarios, the sources of problems, and the affected elements of the frequent idle-active state transition scenarios that may cause signaling inefficiency and reduced battery life caused by mobile data application status updates and keep-alive messages.

It is desired to reduce the signaling traffic for status update messages and keep-alive messages from different applications running on a WTRU, as well as to reduce the WTRU's energy consumption and increase its battery life. In order to achieve those goals, it is desired that the WTRU stay in the idle state for a longer period of time. Additionally, it is desired to synchronize keep-alive messages across applications so that when the WTRU is in the active state, it is able to receive and send update messages and keep-alive messages for multiple running applications. As a result, the WTRU may not have to cycle among idle state, re-establish the connection, send and receive the messages, and go back to idle state very frequently. The reduced number of the cycles during a fixed time period may significantly increase the WTRU's battery life, and reduce the signaling traffic in the CN and RAN.

A new network function, called the negotiation and synchronization function (NSF), may reside in a CN node, such as in the P-GW or in a node closely coupled with the P-GW. The P-GW may reside at the boundary of the CN. For MO messages, the NSF may act as the surrogate for WTRUs whose traffic may pass through the P-GW to the external network and reaches the AS's.

The NSF may be in charge of negotiating with the AS's of the running applications on a WTRU to determine how frequent a WTRU needs to send update messages and/or keep-alive messages. The NSF may then communicate the negotiated frequency (frequencies) to the WTRU. Based on the negotiation, if one frequency is agreed for all the running applications, the WTRU may send the keep-alive messages for its running applications in a synchronized manner.

Alternatively, if one frequency is not agreed for all the running applications, but the applications may be divided into groups with different agreed frequency parameters, the WTRU may send the keep-alive messages for each group of running applications in a synchronized manner.

The NSF may be in charge of negotiating with the WTRU for virtual keep-alive messages. If an AS demands a frequency that is very small, in the normal situation, the WTRU may send the keep-alive messages on a constant basis, and the surrogate server may not reach an agreement with the AS to reduce the frequency. The NSF may request from the WTRU for a keep-alive message at a lower frequency, but it may indicate how long the keep-alive message is valid for. The surrogate server may send the virtual keep-alive message at the frequency the AS demands. On the other hand, the WTRU can proactively request P-GW to send virtual keep-alive messages on behalf of it, without the AS knowing it.

The WTRU may set its active state and active time periods based on the frequency (frequencies) that are agreed to by the NSF.

A new network function, called the buffering and caching function (BCF), may reside at the CN boundary, possibly in the P-GW or closely coupled with the P-GW. The BCF may be in charge of buffering the status update messages from different AS's to WTRUs. The BCF may classify the application messages targeted to the WTRU into different types with priorities or weights. The BCF may permit the messages to be delivered to the WTRU when the WTRU's buffer space is full or during periods when the WTRU is known to be awake and listening. If update messages from particular AS's are not permitted to be buffered or are classified as high priority, then the messages may be immediately forwarded towards the WTRU, and the WTRU may be paged to so that it may receive the message.

The BCF is responsible for data maintenance. The NSF is in charge of controlling. FIGS. 7, 8A, 8B, 9A and 9B show the different options of the overall architecture of a WTRU communicating with different AS's through access and CN entities.

Figure 7:
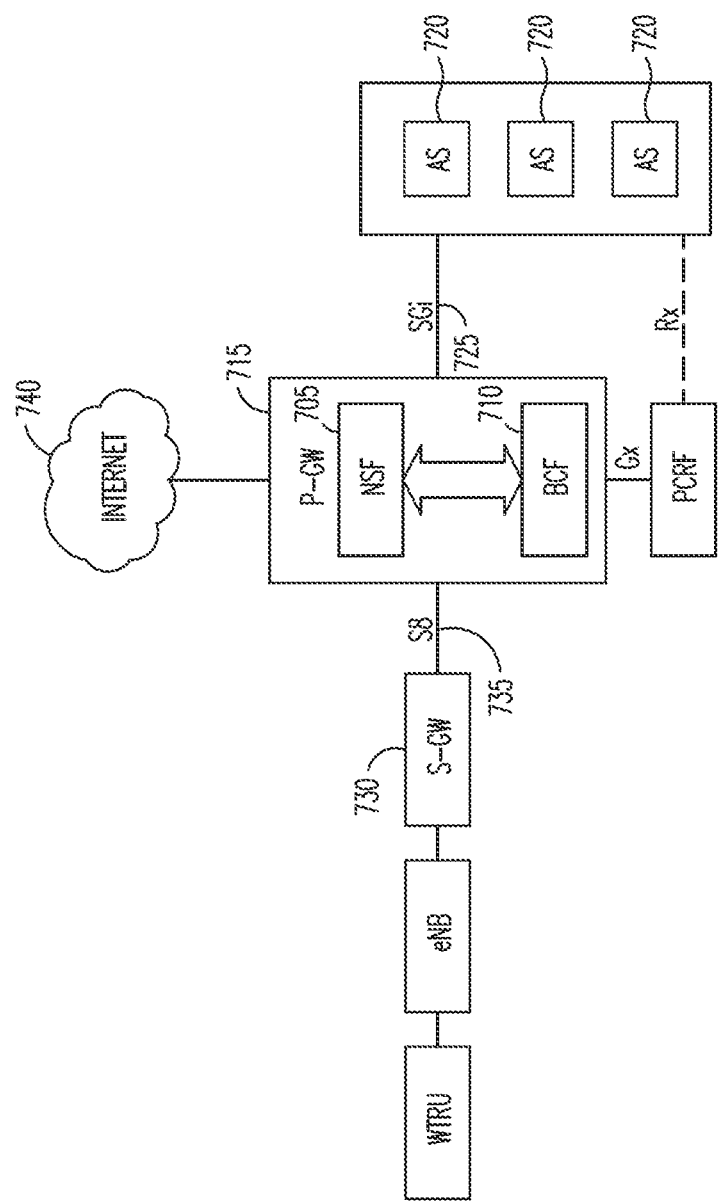
FIG. 7 shows an example of a negotiation and synchronization function (NSF) and a buffering and caching function (BCF) in a packet data network gateway (P-GW)

As shown in FIG. 7, both an NSF 705 and a BCF 710 may reside in a P-GW 715. The NSF 705 and the BCF 710 may communicate with the different AS's 720 through SGi interface 725, and may communicate with an S-GW 730 through an S8 interface 735. The P-GW 715 provides access to the Internet 740.

Figure 8A:
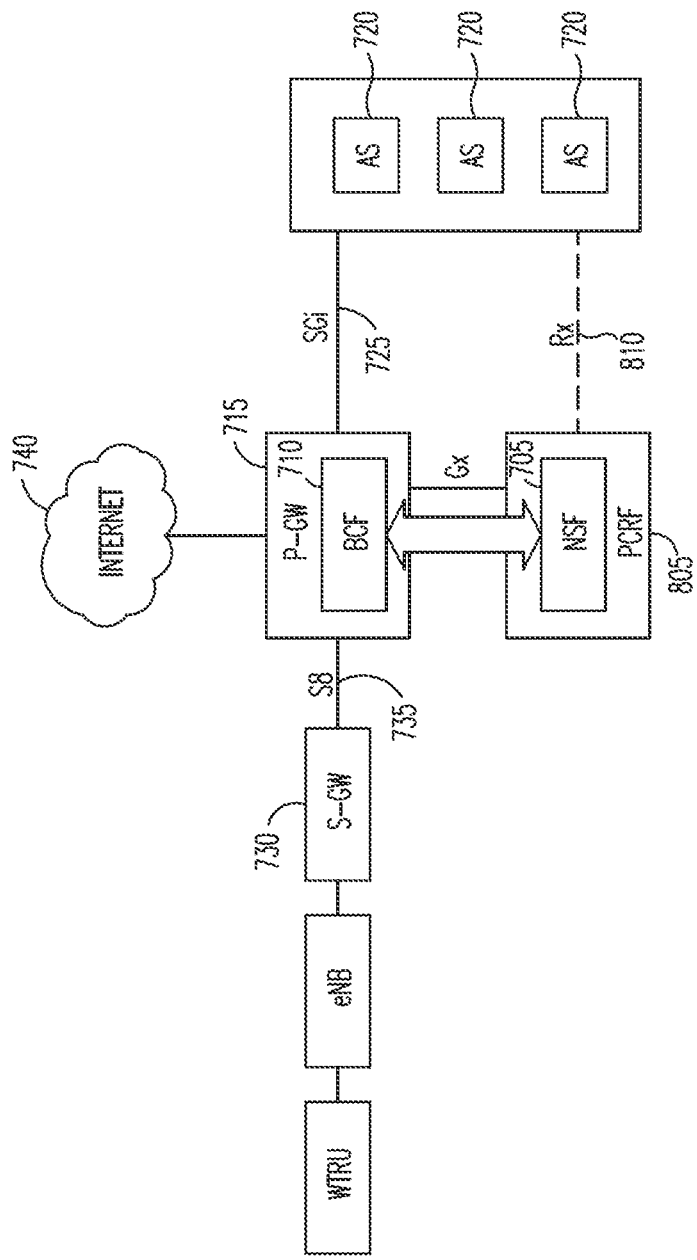
FIGS. 8A and 8B show examples of a BCF in a P-GW and an NSF in a policy control and charging rules function (PCRF)
Figure 8B:
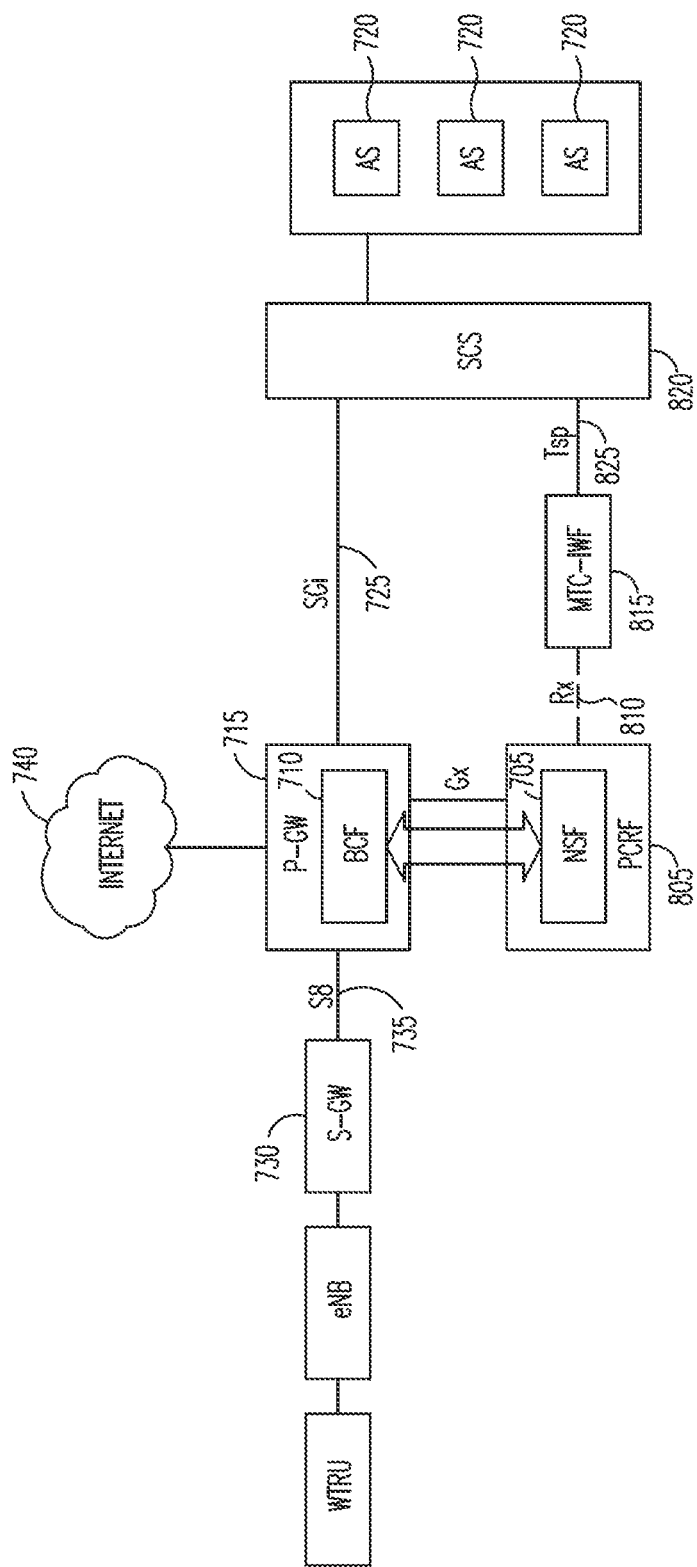

In FIGS. 8A and 8B, the BCF 710 may reside in a P-GW 715, while the NSF 705 may reside in a PCRF 805. FIG. 8A shows the architecture and reference points that may be suitable for both MTC and non-MTC scenarios. The BCF 710 may communicate with the AS's 720 through SGi 725, while the NSF 705 may communicate with the AS's 720 through Rx 810. FIG. 8B shows the architecture and reference points for the MTC scenario, in which the NSF 705 may communicate with an MTC-IWF 815 through a reference point (via Rx 810). The MTC-IWF 815 may communicate with a services capability server (SCS) 820 through Tsp 825. The BCF 710 may communicate with the SCS 820 through SGi 725.

Figure 9A:
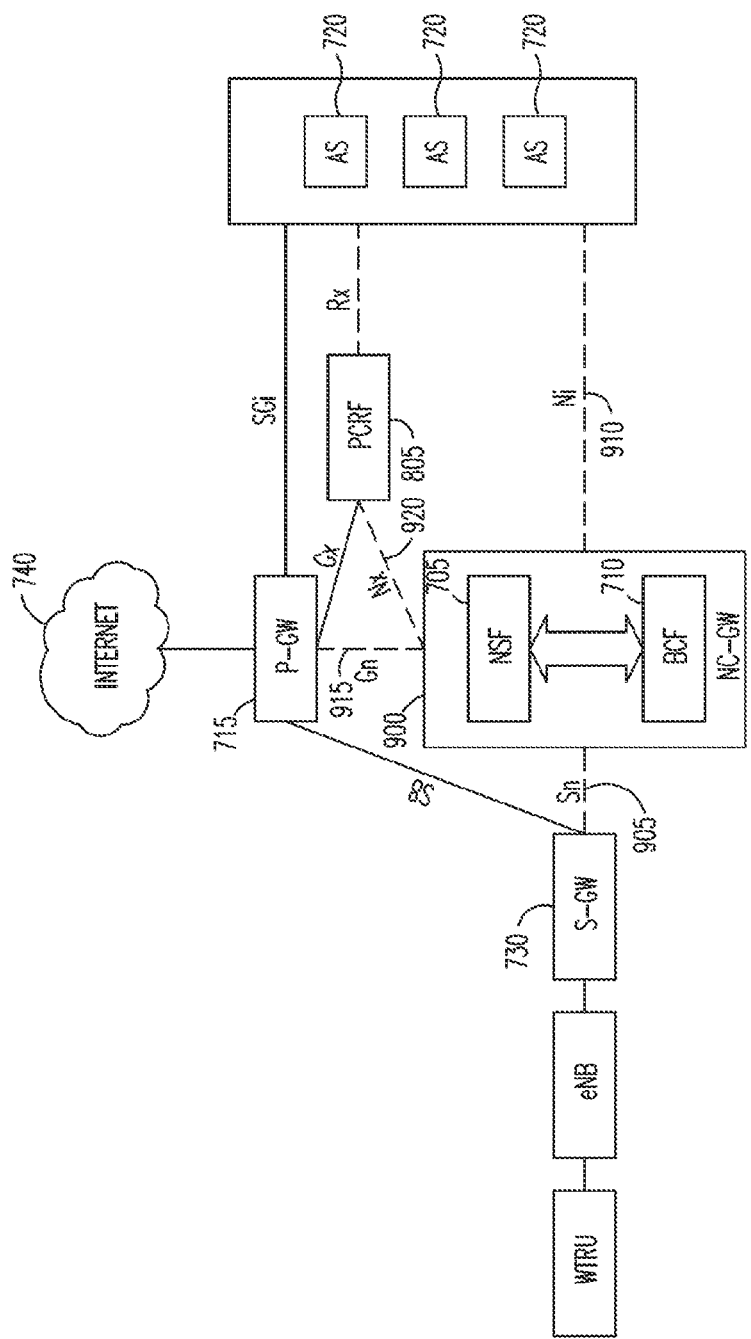
FIG. 9A shows an example of an NSF and a BCF in a negotiation and caching gateway (NC-GW) that interfaces with a serving gateway (S-GW), a P-GW, a PCRF and the Internet.
Figure 9B:
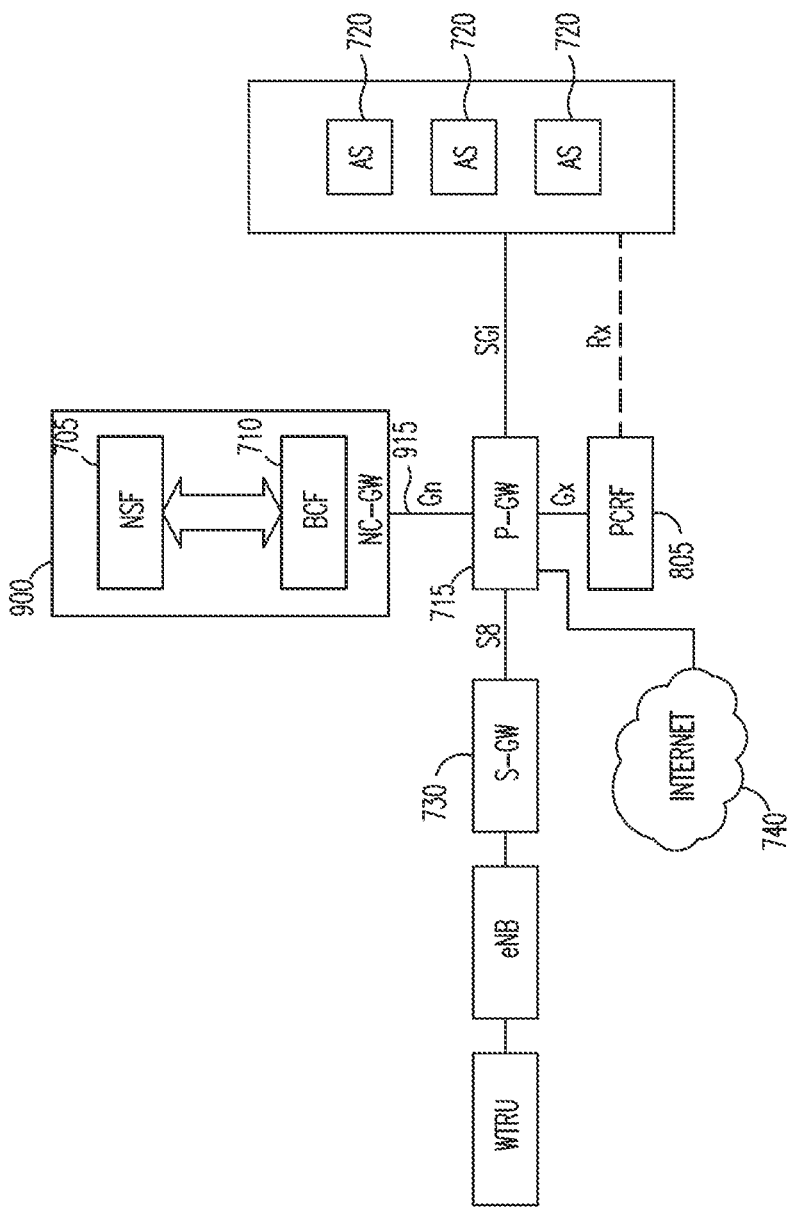
FIG. 9B shows an example of an NSF and a BCF in an NC-GW that interfaces with a P-GW.

FIGS. 9A and 9B show the NSF 705 and the BCF 710 residing in a new standalone node called a negotiation and caching gateway (NC-GW) 900. FIG. 9A shows that the NC-GW 900 interacts with the S-GW 730 by a newly defined Sn interface 905, with the different AS's 720 through a newly defined interface Ni 910, with P-GW 715 by a newly defined interface Gn 915, and with the PCRF 805 by a newly defined interface Nx 920.

In FIG. 9B, the NC-GW 900 may only interact with the P-GW 715 directly by the newly defined interface Gn 915, but may communicate with the S-GW 730, the PCRF 805, and the Internet 740 indirectly through the P-GW 715.

The BCF may be in charge of maintaining the following information related to WTRUs: active and idle schedule, running applications, and messages from different AS's targeted to the WTRU, such as update messages. Each running application may be identified by its port identification (ID). For each application, application specific attributes and messages are cached and buffered that indicate whether the application needs to send periodic keep-alive messages to the associated AS. If the application needs to send periodic keep-alive messages, the frequency, which may change over the time, may be indicated, as well as the associated AS, to which the keep-alive messages are sent to. This information may be stored as a destination transport address, (e.g., IP address/port ID). If the application needs to send periodic keep-alive messages, the latest one may be cached.

If the WTRU is configured to support an extended discontinuous reception (DRX) cycle, or is provisioned to communicate at certain times of the day, then the BCF may obtain the WTRU's active/idle schedule from the home subscriber server (HSS), MME, or SCS. Alternatively, the active and idle schedule may be inferred from the messages forwarded by the P-GW for each WTRU. A WTRU may be active when the P-GW receives a message from the WTRU to an AS. Thus, the BCF may cache the time when it receives the messages that originated from the WTRU. As a result, for each WTRU that has traffic going through the P-GW, the BCF may record the attributes of the messages that are forwarded by the P-GW originated from the WTRU as shown in FIG. 10. The P-GW may also get the active and idle state schedule by the WTRU proactively notifying the P-GW, or by retrieving it from the AS's.

For each running application on a WTRU, the BCF may maintain the status, attributes, mobile-originated (MO) or/and mobile-terminated (MT) messages related to the application as shown in FIG. 11. The information may be leveraged by the NSF for controlling.

The NSF has the following functionalities: original MO keep-alive message frequency information inquiry, MO keep-alive message frequency negotiation and settlement, MO keep-alive message frequency update, MO keep-alive message reduction, and MT message buffering and prioritizing.

For a WTRU, the NSF may collect the frequencies of the keep-alive messages required by AS's for different running applications. The information may be requested by the NSF and retrieved from the BCF. Based on the information in FIG. 12, the NSF may filter the applications running on the WTRU such that applications that are "always-running" may send the keep-alive messages to different AS's. Thus, the NSF may retrieve the keep-alive message frequencies as well as the contacting addresses of the associated AS's of those applications. For each WTRU that has traffic passing through the P-GW, the NSF may use the information shown in FIG. 12 to perform the following procedures.

FIG. 13 shows a keep-alive message frequency negotiation request message 1300. The NSF may send the request message 1300 to those associated AS's to negotiate for a more proper frequency for each running application, on behalf of the WTRU. The more proper frequency may indicate that this frequency may be agreed upon by different AS's, to which the WTRU may send keep-alive messages. The request message 1300 may include a message identifier (ID) 1305, a WTRU ID 1310, a field 1315 indicating the number of applications, application ID fields $1320_1$, $1320_2, \ldots, 1320_n$, keep-alive message frequency fields $1325_1, 1325_2, \ldots, 1325_n$, and a field 1330 indicating a proposed frequency.

The message ID may be echoed to match the response message 1400 to the request message 1300. The number of applications field 1315 may indicate the number of application ID and frequency combinations that follow. The optimal frequency that the NSF proposes may be the maximum of all of the current frequencies. The request message 1300 may be multicasted or unicasted to the related AS's. If the NSF chooses to multicast the request message 1300, the request message 1300 may have the format as shown in FIG. 13. If the NSF chooses to unicast the request message, the request message 1300 may not include the application ID fields 1320 and the application frequency fields 1325 which may corresponds to the destination AS. For example, fields $1320_1$ and $1325_1$ may be removed from the frequency negotiation request message 1300, which may be sent to a particular AS. The particular AS may be able to find out the frequency based on the WTRU ID and the application ID from its own database. Thus, the size of the request message 1300 and the amount of bandwidth usage for transmitting the request message 1300 may be reduced. However, all of the application IDs and frequencies in the request message 1300 may be included, irrespective of whether unicasting or multicasting transmission is used.

The frequency parameter for each application may be inferred by the P-GW from the keep-alive messages it has forwarded and inspected, which may not be exactly the same as those that the AS keeps in its database. Thus, the seemly duplicate information may be used to verify that the P-GW learns the correct frequency parameter for each application. The AS may be able to compare the value with the one stored locally and inform the P-GW with the correct one. The P-GW may correct the parameter and adjust its frequency inferring algorithm for future usage.

When an AS receives a frequency negotiation request message 1300, it may retrieve the information of the keep-alive message frequencies of all running applications on the WTRU, as well as the proposed frequency from the NSF. It first may check the correctness of the frequency it requires for its own application, and compare with the parameter in its database. If it is correct, a valid code may be included in the response message. Otherwise, the invalid code and the correct parameter may be included. The AS may also check the proposed frequency to see whether it is able to accept. If the AS is able to allow the application on the WTRU to send the keep-alive messages at the proposed frequency, the frequency may be echoed in the proposed frequency field in the response message. Otherwise, the AS may look into the frequencies of other applications in the request message, and come up with its own proposed frequency. The AS may stick to the original one, or use its proprietary algorithm with the frequencies of other applications and the proposed frequency from the NSF as the input.

FIG. 14 shows a keep-alive message frequency negotiation response message 1400 including a message ID field 1405, application ID field(s) 1410, a code field 1415, frequency field(s) 1420, and a field 1425 indicating a proposed frequency range 1425. The message ID field 1405 may be the same as message ID field 1305 in the corresponding request message 1300 and echoed back to the NSF to perform the matching. The application ID field 1410 may indicate the application that the AS is associated to. The code field 1415 may indicate whether the frequency of this particular application included in the request message 1300 is valid or not. If it is invalid, the frequency field 1420 may include the correct parameter. Otherwise, a code field 1415 may not be included. The field 1425 may indicate a frequency range that the AS allows after running its proprietary algorithm with the information in the request message 1300 as the input.

Figure 15:
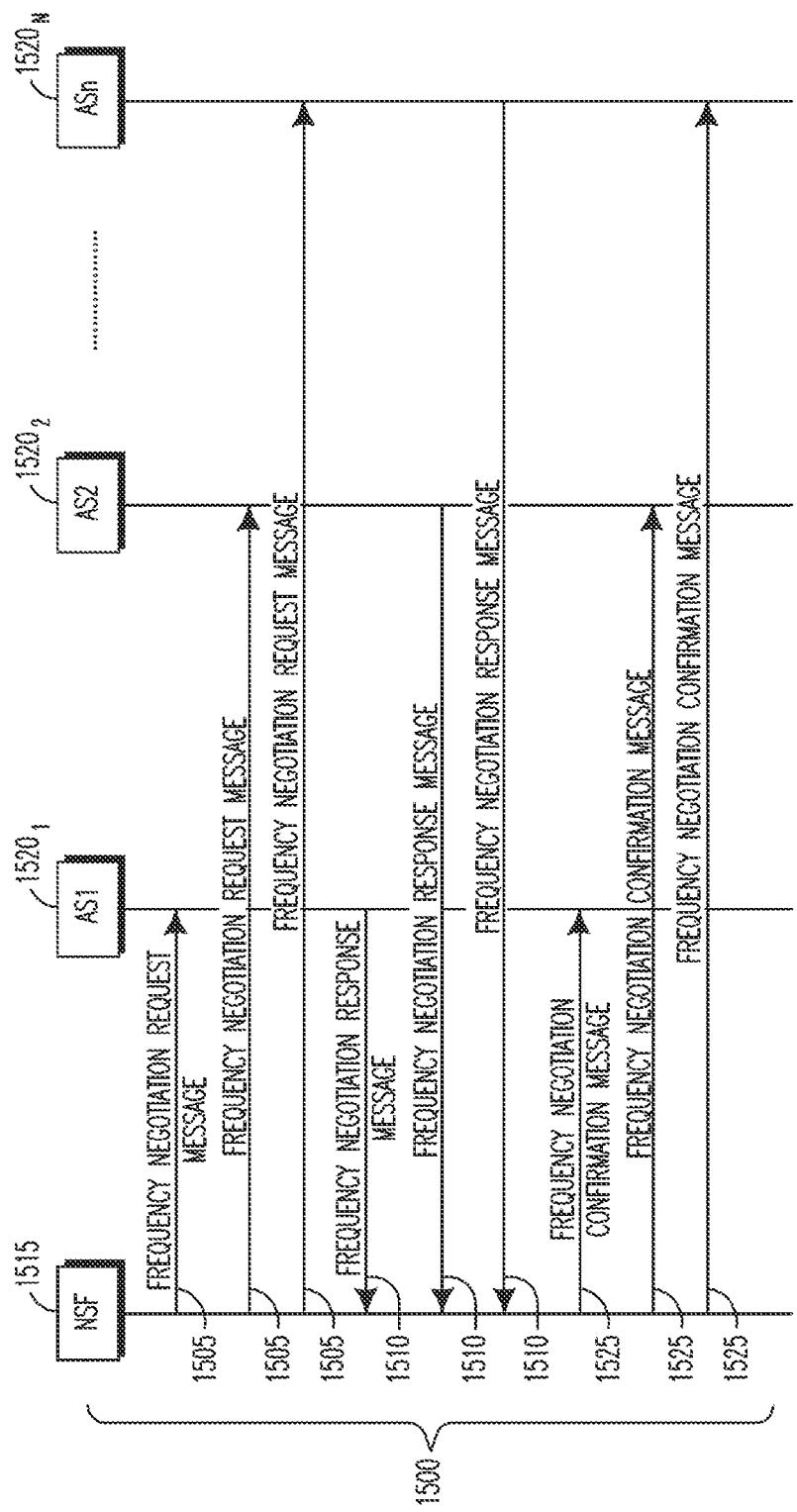
FIG. 15 shows an example of a message flow diagram of a frequency negotiation procedure.

FIG. 15 shows a message flow 1500 of MO keep-alive message frequency negotiation request messages 1505 and response messages 1510. The request messages 1505 may either be multicasted or unicasted to each related AS, and the response message 1510 may be returned separately. After an NSF 1515 collects all the response messages 1510 from a plurality of application servers (AS's) $1520_1, 1520_2, \ldots, 1520_n$, based on the code and the proposed frequency ranges, the NSF 1515 may choose the frequency that is acceptable by all the AS's 1520 in the ideal scenario. The NSF 1515 may send a frequency negotiation confirmation message 1525 to each AS 1520 with the agreed frequency.

Every AS associated to one running application on a WTRU may allow the WTRU to send the keep-alive messages at the same frequency. Under this scenario, the WTRU may base its alive and idle schedule on the agreed frequency, and be active periodically to send the keep-alive messages for all running applications during the active period.

Alternately, the NSF may receive the responses from the different AS's, but several frequencies are agreed to. Under this scenario, the running applications may be divided into groups, each of which has a keep-alive message frequency needed to be followed by all respective application servers associated with each group.

In another scenario, every AS may refuse to participate in any negotiation with the NSF. Under this scenario, all of the running applications may follow the original required frequency to send keep-alive messages to each AS.

FIG. 16 shows an updated frequency informing message 1600 identifying a plurality of applications and frequencies 1, 2, . . . , x.

FIG. 17 shows the message flow of an updated frequency informing procedure 1700 performed by a WTRU 1705 and an NSF 1710. The NSF 1710 may send the updated frequency informing message 1600 to the WTRU 1705. The frequency attribute of each application on the WTRU 1705 may be updated by the NSF 1705 accordingly. In response, the WTRU 1705 may send a positive acknowledgement (ACK) message 1715 to the NSF 1710 to confirm that each of the applications (1, 2, . . . , x) has adjusted its MO keep-alive message frequency based on the updated frequency informing message 1600.

Figures 18, 19:
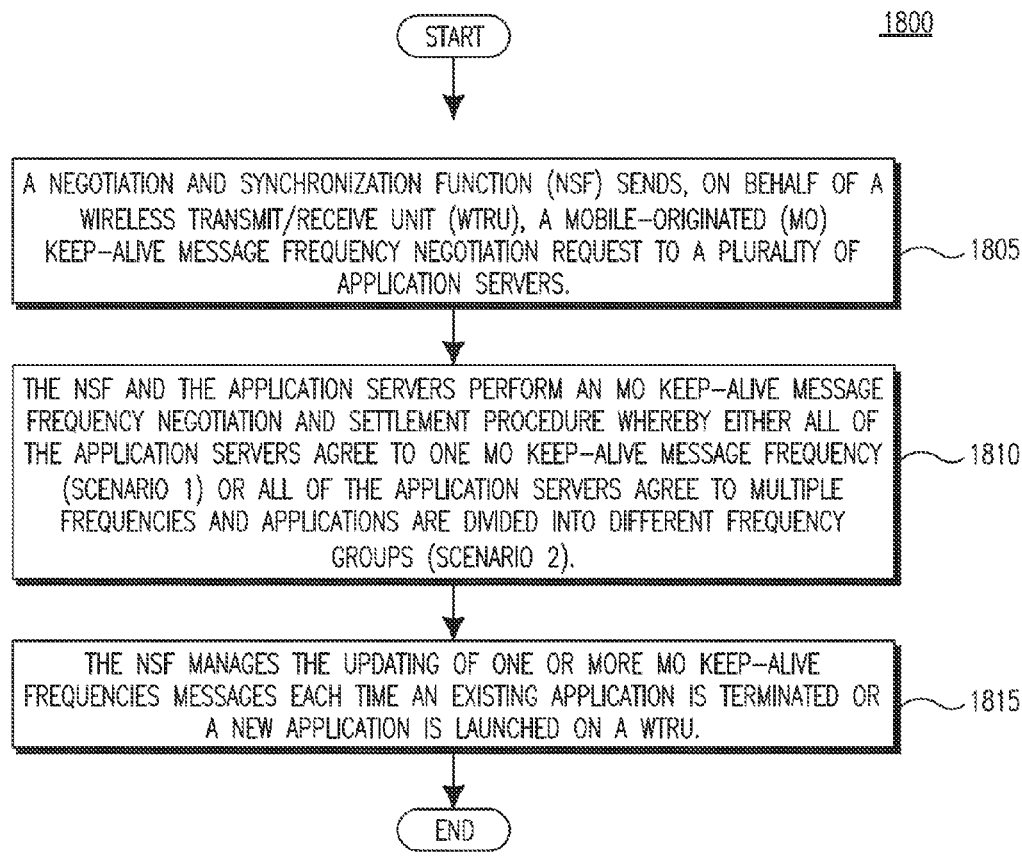
FIG. 18 is a flow diagram of an example of a mobile-originated (MO) keep-alive message frequency negotiation and update procedure.
FIG. 19 shows an example of a simplified frequency negotiation request message.

FIG. 18 is a flow diagram of a mobile-originated (MO) keep-alive message frequency negotiation and update procedure 1800. A negotiation and synchronization function (NSF) may send, on behalf of a WTRU, an MO keep-alive message frequency negotiation request to a plurality of application servers (1805). The NSF and the application servers may perform an MO keep-alive message frequency negotiation and settlement procedure whereby either all of the application servers may agree to one MO keep-alive message frequency, or all of the application servers may agree to multiple MO keep-alive message frequencies and the application servers are divided into groups (1810). The NSF may manage updating of one or more keep-alive message frequencies each time an existing application is terminated or a new application that requires keep-live messages is launched on a WTRU (1815).

FIG. 19 shows an example of a simplified frequency negotiation request message 1900 including a message ID field 1905 and a proposed frequency field 1910.

Figure 20:
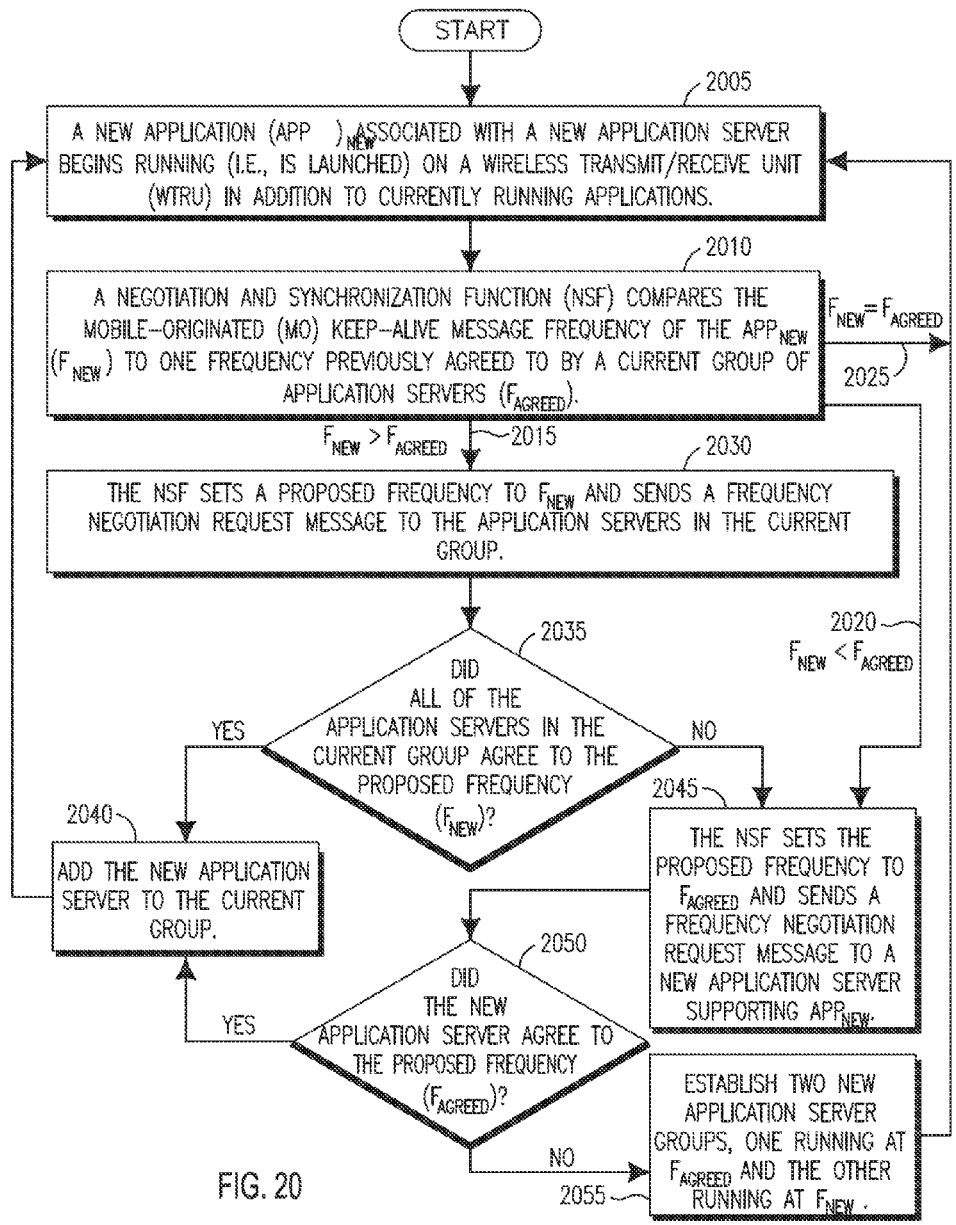
FIG. 20 is an example of a flow diagram of a frequency update procedure when one MO keep-alive message frequency is agreed to by a plurality of application servers.

FIG. 20 is an example of a flow diagram of a frequency update procedure 2000 when one MO keep-alive message frequency is agreed to by a plurality of application servers. As a result, the current running applications that are required to send keep-alive messages may send them at the agreed frequency. If an application is terminated, the status of the application stored in the BCF may be changed to reflect that the application was terminated. The agreed frequency parameter may not be affected. If there is a new application launched on the WTRU, the BCF may infer and record the original frequency of the application.

Still referring to FIG. 20, a new application, $APP_{NEW}$, may begin running (i.e., may be launched) on a WTRU in addition to currently running applications (2005). An NSF may compare the MO keep-alive message frequency of $APP_{NEW}$ ($F_{NEW}$) to one frequency previously agreed to by a current group of application servers ($F_{AGREED}$) (2010). The outcome of comparison 2010 may be that $F_{NEW}$ is larger than $F_{AGREED}$ (2015), $F_{NEW}$ is smaller than $F_{AGREED}$ (2020), or $F_{NEW}=F_{AGREED}$ (2025).

As shown in FIG. 20, the NSF may set a proposed frequency to $F_{NEW}$ and send a frequency negotiation request message to the application servers in the current group (2030). On a condition that all of the application servers in the current group agree to the proposed frequency ($F_{NEW}$) (2035), the new application server may be added to the current group (2040). On a condition that all of the application servers in the current group do not agree to the proposed frequency ($F_{NEW}$) (2035), the NSF may set the proposed frequency to $F_{AGREED}$ and send a frequency negotiation request message to a new application server supporting $APP_{NEW}$ (2045). On a condition that the new application server agrees to the proposed frequency ($F_{AGREED}$) (2050), the new application server may be added to the current group (2040). On a condition that the new application server does not agree to the proposed frequency ($F_{AGREED}$) (2050), two new application server groups may be established, one running at $F_{AGREED}$ and the other running at $F_{NEW}$.

When the outcome of comparison 2010 is that $F_{NEW}$ is larger than $F_{AGREED}$ (2015), the NSF may set the proposed frequency to be the frequency of the new application ($APP_{NEW}$) and send a frequency negotiation request message to the related application servers (see 1505 in FIG. 15). Since there is an agreed frequency among the applications, the frequency negotiation request message 1505 may be simplified to only include a message ID 1905 and a proposed frequency 1910 as depicted by the message 1900 of FIG. 19. If the proposed frequency is not agreed to by all of the application servers, the NSF may set the proposed frequency to be the old agreed frequency and send the frequency negotiation message to the AS associated with new application. This procedure may indicate that the NSF proposes that the WTRU may send the keep-alive message to the new application server at a higher speed, such that the WTRU always wakes up at the same frequency to send the keep-alive messages to all of the application servers including the new application server. The new application server may reject the proposed frequency for reasons such as it does not want to handle the unnecessary keep-alive messages. If this scenario occurs, the applications (application servers) may be divided into two groups. The first group may still follow the old agreed frequency. The second group may follow the new frequency, (which is the frequency of the new application server), which contains the new application.

When the outcome of comparison 2010 is that $F_{NEW}$ is smaller than $F_{AGREED}$ (2020), the NSF may set the proposed frequency to be the old agreed one, and send the simplified frequency negotiation request message to the new application server. If the new application server accepts the proposed frequency, then all of the applications including the new application may have one agreed frequency. Otherwise, the applications (application servers) may be divided into two groups. The first group may still follow the old agreed frequency and contain all of the current (old) applications. The second group may follow the new frequency, (which is the frequency of the new application), which may only contain the new application.

When the outcome of comparison 2010 is that $F_{NEW}=F_{AGREED}$ (2025), if the frequency is the same as the agreed frequency, nothing may need to be updated or changed.

Figure 21A:
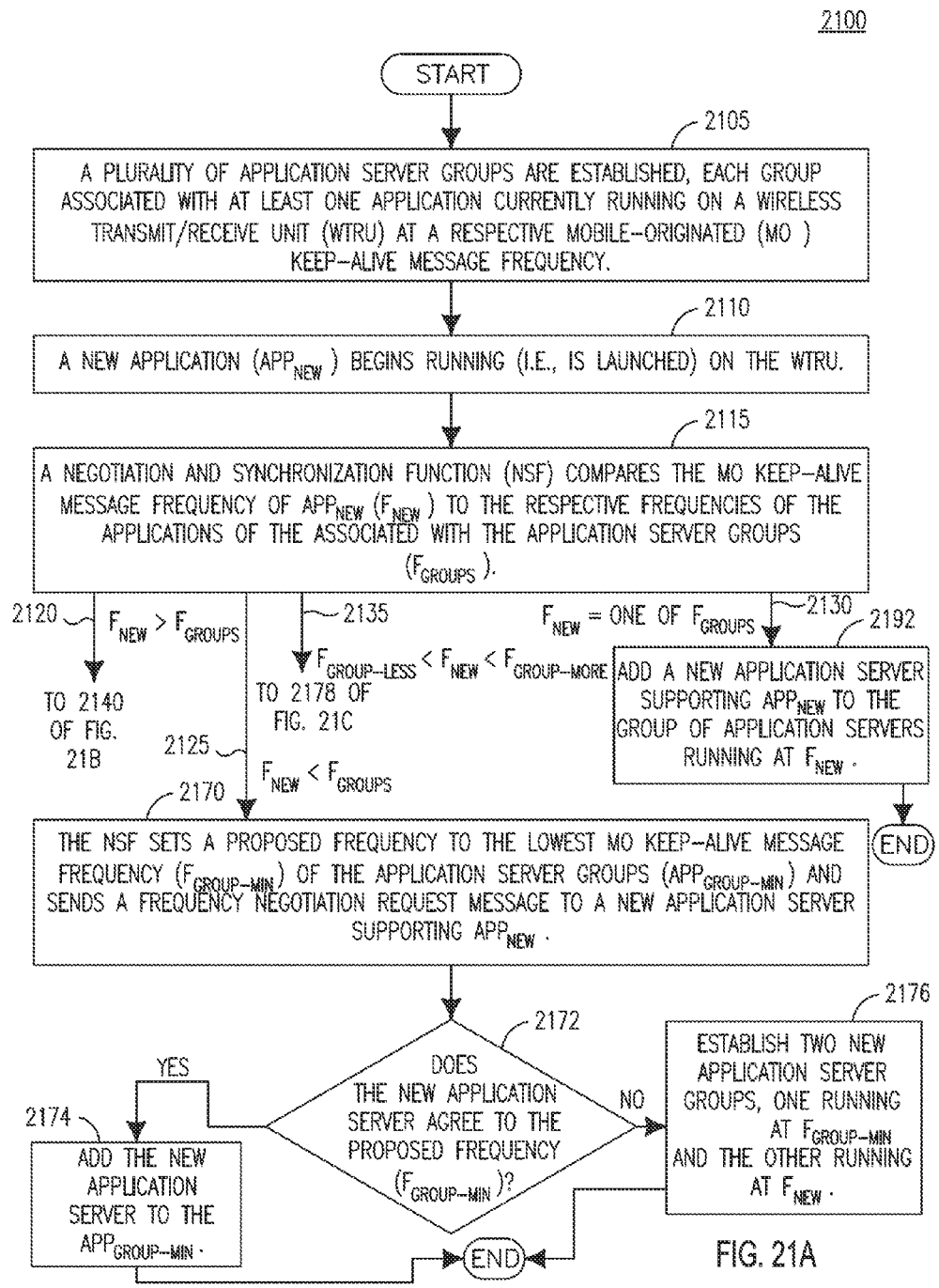
FIGS. 21A, 21B and 21C, taken together, are an example of a flow diagram of a frequency update procedure when multiple MO keep-alive message frequencies are agreed to by a plurality of application servers and are divided into groups.
Figure 21B:
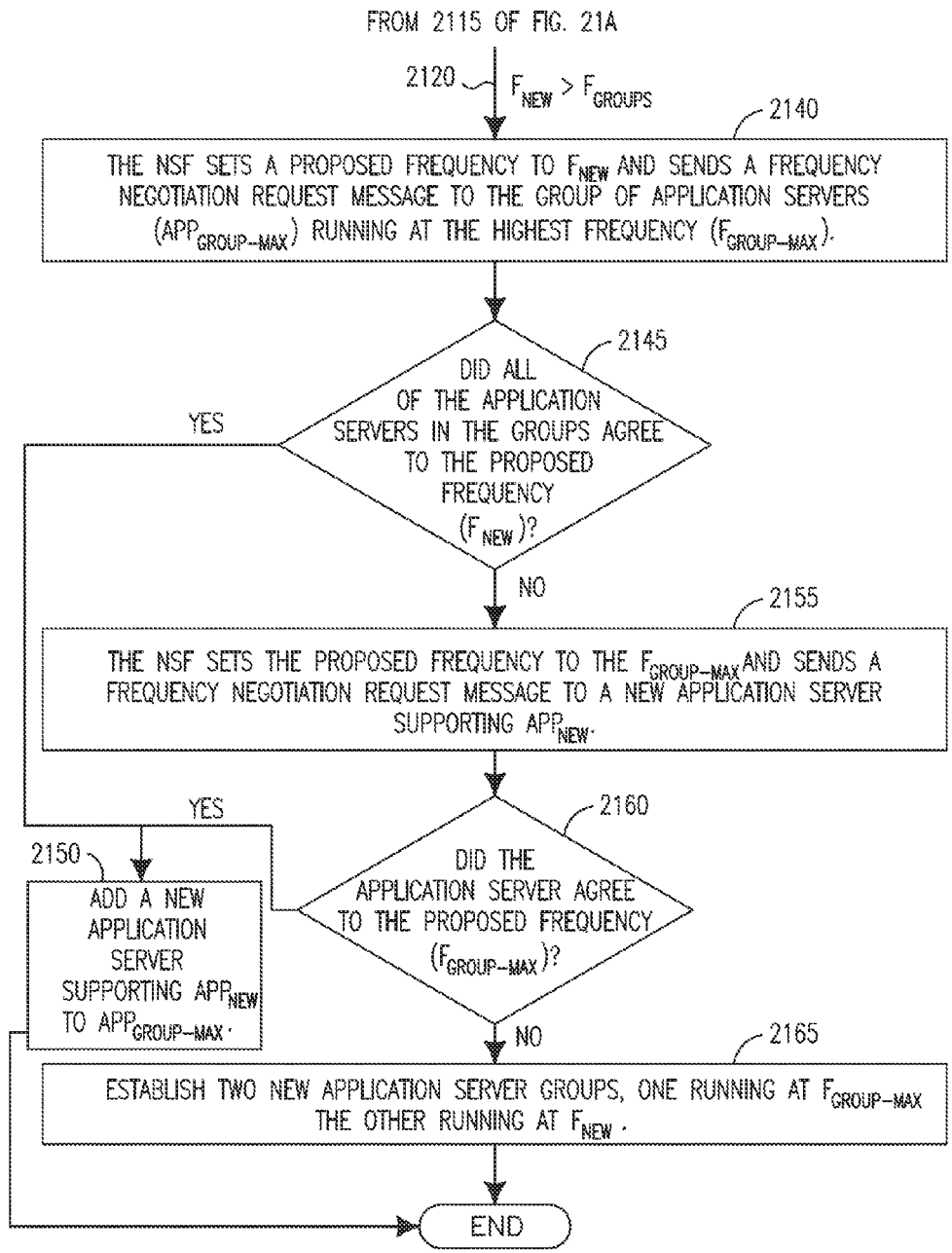
Figure 21C:
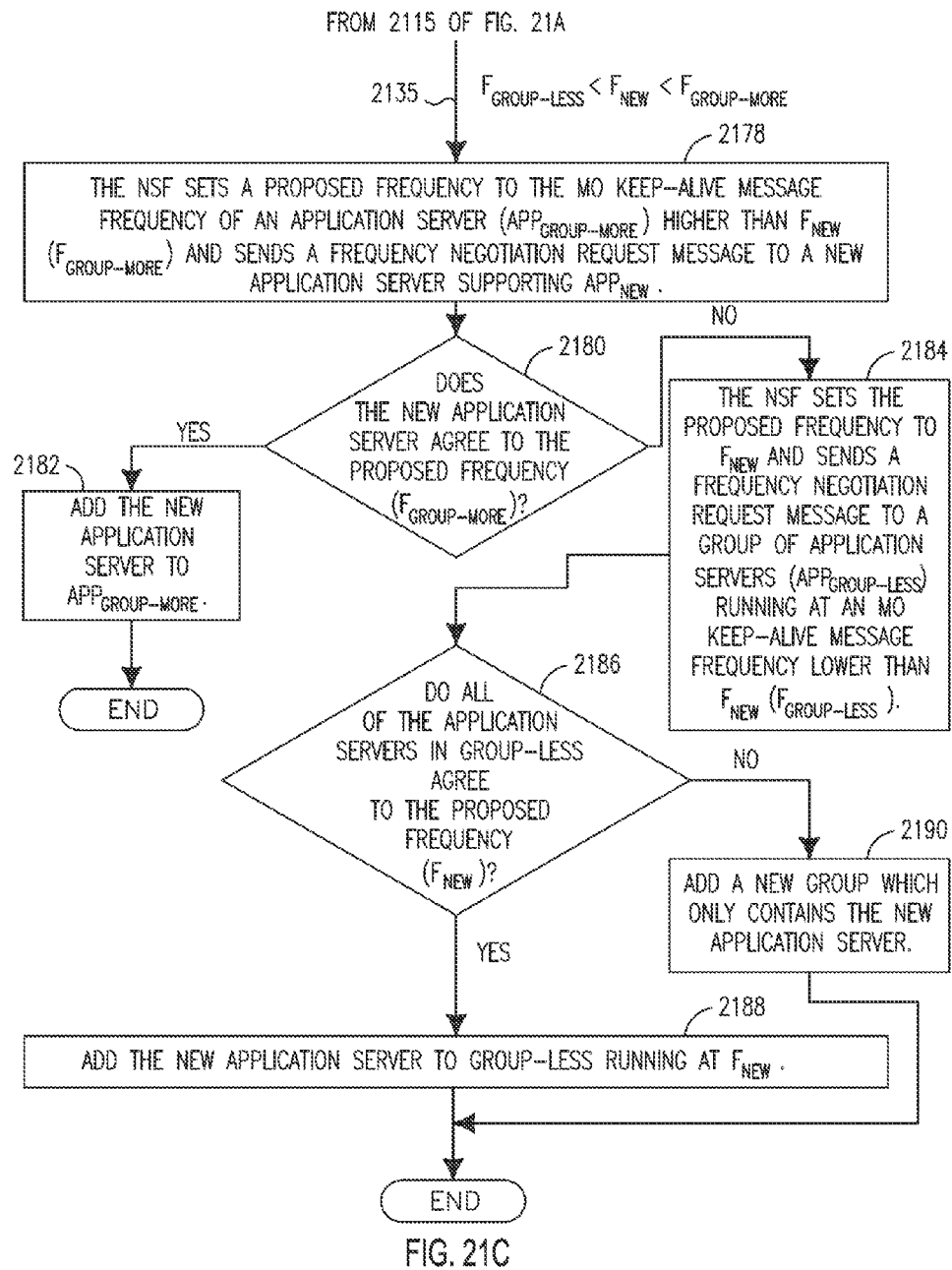

FIGS. 21A, 21B and 21C, taken together, are an example of a flow diagram of a frequency update procedure 2100 when multiple MO keep-alive message frequencies are agreed to by a plurality of application servers and are divided into groups.

Referring to FIG. 21A, a plurality of application server groups may be established, each group associated with at least one application currently running on a WTRU at a respective MO keep-alive message frequency (2105). A new application, $APP_{NEW}$, may begin running (i.e., may be launched) on the WTRU (2110). An NSF may compare the MO keep-alive message frequency of $APP_{NEW}$ ($F_{NEW}$) to the respective frequencies of the applications associated with the application server groups ($F_{GROUPS}$) (2115). The outcome of comparison 2115 may be that $F_{NEW}$ is larger than $F_{GROUPS}$ (2120), $F_{NEW}$ is smaller than $F_{GROUPS}$ (2125). $F_{NEW}$ is equal to one of the $F_{GROUPS}$ (2130), or $F_{NEW}$ is larger than $F_{GROUP-LESS}$ and smaller than $F_{GROUP-MORE}$ (2135), where $F_{GROUP-LESS}$ and $F_{GROUP-MORE}$ are the lower and upper frequency limits of MO keep-alive message frequency that the application servers operate at.

Referring to FIGS. 21A and 21B, when the outcome of comparison 2115 is that $F_{NEW}$ is larger than $F_{GROUPS}$ (2120), the NSF may set a proposed frequency to $F_{NEW}$ and send a frequency negotiation request message to the group of application servers ($APP_{GROUP-MAX}$) running at the highest frequency ($F_{GROUP-MAX}$) (2140). On a condition that all of the application servers in the groups agree to the proposed frequency ($F_{NEW}$) (2145), a new application supporting $APP_{NEW}$ may be added to $APP_{GROUP-MAX}$ (2150). On a condition that all of the application servers in the groups do not agree to the proposed frequency ($F_{NEW}$) (2145), the NSF may set the proposed frequency to $F_{GROUP-MAX}$ and send a frequency negotiation request message to a new application server supporting $APP_{NEW}$ (2155). On a condition that the new application server agrees to the proposed frequency ($F_{GROUP-MAX}$) (2160), the new application supporting $APP_{NEW}$ may be added to $APP_{GROUP-MAX}$ (2150). On a condition that the new application server does not agree to the proposed frequency ($F_{GROUP-MAX}$) (2160), two new application server groups may be established, one running at $F_{GROUP-MAX}$ and the other running at $F_{NEW}$ (2165).

Referring to FIG. 21A, when the outcome of comparison 2115 is that $F_{NEW}$ is smaller than $F_{GROUPS}$ (2125), the NSF may set a proposed frequency to the lowest MO keep-alive message frequency ($F_{GROUP-MAX}$) of the application server groups ($APP_{GROUP-MIN}$) and send a frequency negotiation request message to a new application server supporting $APP_{NEW}$ (2170). On a condition that the new application server agrees to the proposed frequency ($F_{GROUP-MIN}$) (2172), the new application server may be added to $APP_{GROUP-MIN}$ (2174). On a condition that the new application server does not agree to the proposed frequency ($F_{GROUP-MIN}$) (2172), two new application server groups may be established, one running at $F_{GROUP-MIN}$ and the other running at $F_{NEW}$ (2176).

Referring to FIGS. 21A and 21C, when the outcome of comparison 2115 is that $F_{NEW}$ is larger than $F_{GROUP-LESS}$ and smaller than $F_{GROUP-MORE}$ (2135), the NSF may set a proposed frequency to the MO keep-alive message frequency of an application server group ($APP_{GROUP-MORE}$) higher than $F_{NEW}$ ($F_{GROUP-MORE}$) and send a frequency negotiation request message to a new application server supporting $APP_{NEW}$ (2178). On a condition that the new application server agrees to the proposed frequency ($F_{GROUP-MORE}$) (2180), the new application server may be added to $APP_{GROUP-MORE}$ (2182). On a condition that the new application server does not agree to the proposed frequency ($F_{GROUP-MORE}$) (2180), the NSF may set the proposed frequency to $F_{NEW}$ and send a frequency negotiation request message to a group of application servers ($APP_{GROUP-LESS}$) running at an MO keep-alive message frequency lower than $F_{NEW}$ ($F_{GROUP-LESS}$) (2184). On a condition that all of the application servers in group "less" agree to the proposed frequency ($F_{NEW}$) (2186), the new application server may be added to group "less" running at $F_{NEW}$ (2188). On a condition that all of the application servers in group "less" do not agree to the proposed frequency ($F_{NEW}$) (2186), a new group may be added which only contains the new application server (2190).

Referring to FIG. 21A, when the outcome of comparison 2115 is that $F_{NEW}$ is equal to one of the $F_{GROUPS}$ (2130), a new application server supporting $APP_{NEW}$ may be added to the group of application servers running at $F_{NEW}$ (2192).

The current application servers may be divided into groups, (the least desired scenario is that there are a plurality of application server groups, each containing one application). The application servers in each group may follow the same frequency. The NSF may compare the keep-alive message frequency of a new application with the frequencies of the applications associated with the existing groups.

When the outcome of comparison 2115 is that $F_{NEW}$ is larger than $F_{GROUPS}$ (2120), the NSF may set the proposed frequency to a new one, and send a frequency negotiation request message to the application servers with the largest frequency (denoted as GroupMax) and attempt to negotiate with those application servers to agree on the new larger frequency. Application servers in other groups may not be included in this negotiation request message, because the old largest frequency must have been rejected by other groups in the previous negotiation.

In one scenario, all applications associated with application servers in GroupMax and the new application may agree on the proposed frequency. In another scenario, the applications associated with application servers in GroupMax and the new application may be divided into two new groups, one with the old largest frequency and the other with the new frequency.

When the outcome of comparison 2115 is that $F_{NEW}$ is smaller than $F_{GROUPS}$ (2125), the NSF may set the proposed frequency to be the smallest frequency (GroupMin) and send the simplified negotiation request message to a new application server associated with a new application. If the new application server accepts the proposed frequency, then the application servers in GroupMin plus the new application server may have one agreed frequency and the new application server may be assigned to GroupMin. Otherwise, there may be one new group created, which only contains the new application server.

When $F_{NEW}$ is larger than $F_{GROUP-LESS}$ (the smallest frequency) and smaller than $F_{GROUP-MORE}$ (the largest frequency) (2135), the NSF may set the proposed frequency to be $F_{GROUP-MORE}$, and send a simplified frequency negotiation request message to a new application server. If the new application server agrees with the proposed frequency, it may be assigned to group "more". If the new application server rejects the proposed frequency, the NSF may set the proposed frequency to be $F_{NEW}$, and send a frequency negotiation request message to all application servers in group "less". If all application servers in group "less" agree with the proposed frequency, then the new application server may be assigned to group "less" and the frequency of group "less" may be changed to be $F_{NEW}$. If no agreement is reached, a new group may be added which only contains the new application server.

When $F_{NEW}$ is equal to one of the $F_{GROUPS}$ (2130), the new application server may be put in the corresponding group.

An optimization scheme may be provided by the NSF, which may act as a surrogate server for WTRUs. The surrogate service may be provided by the NSF proactively, or may be requested by the AS or WTRU. The first scenario is that the NSF may proactively desire to provide the surrogate service to the WTRU, (or the surrogate service may be requested by the AS), but the WTRU may accept the service. On the other hand, the second scenario is that the WTRU may request the NSF to provide the surrogate service to it. The NSF may accept the request from the WTRU.

The NSF may attempt to negotiate with the WTRU to send the keep-alive messages at the same frequency for all running applications, under the condition that each application may ensure to the NSF that one keep-alive message from the application functions as multiple messages. For example, the agreed frequencies between the NSF and the application servers may be 6 seconds, 10 seconds and 15 seconds from previously described procedures. Thus, the most desired and synchronized frequency that the NSF may observe is 30 seconds for all running applications on that WTRU.

The NSF may request the applications in 6-second groups to send the keep-alive messages at the frequency of 30 seconds, but ensure its aliveness in the next five 6-second slots. Similarly, the NSF may request applications in 10-second groups to send the keep-alive messages at the frequency of 30 seconds but ensure its aliveness in the next three 10-second slots, applications in 15-second groups to send the keep-alive messages at the frequency of 30 seconds but ensure its aliveness in the next two 15-second slots. The NSF may represent the WTRU to send the virtual keep-alive messages for each application in these groups, following the same format and frequency the AS requires.

FIG. 22 shows an example of an MO keep-alive message reduction request message 2200 sent by an NSF to a WTRU. FIG. 23 shows an example of an MO keep-alive message reduction response message 2300 sent by the WTRU. As shown in FIGS. 22 and 23, the message ID fields 2205 and 2305 may be used to match the MO keep-alive message reduction request message 2200 and the MO keep-alive message reduction response message 2300. The "number of groups" fields 2210 and 2310 may indicate how many groups that the running applications are divided into. For each group, there may be one Group ID field 2215 and an associated "number of applications" field 2220. There may be an application ID field 2225 for each application running on the WTRU. The proposed frequency field 2230 may be the least common multiple of the agreed frequencies of all groups.

When the WTRU receives the MO keep-alive message reduction request message 2200, it may make all related applications aware of the new frequency and update accordingly. This may require an application to guarantee its aliveness during the period when two adjacent keep-alive messages are being sent out. If the application is not able to make this guarantee, it may return with a reject response to the P-GW. As a result, the MO keep-alive message reduction response message 2300 may include an accept/reject (a/r) field 2315 that may indicate whether the application accepts or rejects the new frequency, as well as a plurality of application ID fields 2320.

If all applications in the MO keep-alive message reduction request message 2200 accept the new frequency, the groups may be merged to one group managed by the NSF.

FIG. 24 shows an example message flow of an MO keep-alive message reduction procedure initiated by an NSF. The BCF may maintain the number of virtual keep-alive messages sent by the NSF for those applications from which the NSF knows how many virtual keep-alive messages may be sent to the application server on behalf of the application. The virtual keep-alive messages may have the same format as the latest real keep-alive message cached in the BCF as if it is sent by the application from the WTRU. If some of the applications reply with rejection, they may stay in the old groups. Others may be moved to a new group with the new frequency.

FIG. 25 shows an example of an MO keep-alive message reduction request message 2500 sent by a WTRU. The WTRU may send the MO keep-alive message reduction request message 2500 to the NSF at any time, regardless of whether there is frequency negotiation or update procedure between the NSF and the application servers. The WTRU may send the MO keep-alive message reduction request message 2500 to the NSF for one or multiple applications with specific proposed frequency or frequencies. The proposed frequency may be a multiple of the original value. For example, if the original keep-alive message frequency of an application is 5 seconds, whether it is initially required by the AS or it is negotiated between the NSF and the application server, and provisioned to the application, the proposed frequency in this reduction request message may be the multiples of 5, such as 10, 15, 20, 30, and the like.

FIG. 26 shows an example message flow of an MO keep-alive message reduction procedure initiated by a WTRU. The keep-alive message reduction response message 2300 is similar to what is shown in FIG. 23. After the application receives an "accept" response from the NSF, the application may send keep-alive messages at the proposed frequency. The NSF may send the virtual keep-alive messages on behalf of the WTRU at the frequency that the application server requires.

The NSF may classify the messages targeted to the WTRU (MT messages) from different application servers into different types with priorities or weights. The priority or weight of a MT message may be derived from the priority attribute of the application or some other factors. By running the previously described procedures, the NSF may know when a WTRU may be active from idle state to send keep-alive messages. In order to keep the WTRU in idle state as much as possible, the NSF may trigger the MT message transmission during the period when the WTRU is active. The buffered MT messages may be sent in accordance with the rule of higher priority first out. If some of the MT messages have very high priority or weight that cannot be delayed, the messages may be sent regardless of the WTRU's status, which may be awoken from the idle state to active state.

Although features and elements are described above in particular combinations, one of ordinary skill in the art will appreciate that each feature or element may be used alone or in combination with any of the other features and elements. In addition, the embodiments described herein may be implemented in a computer program, software, or firmware incorporated in a computer-readable medium for execution by a computer or processor. Examples of computer-readable media include electronic signals, (transmitted over wired or wireless connections), and computer-readable storage media. Examples of computer-readable storage media include, but are not limited to, a read only memory (ROM), a random access memory (RAM), a register, a cache memory, a semiconductor memory device, a magnetic media, (e.g., an internal hard disc or a removable disc), a magneto-optical media, and an optical media such as a compact disc (CD) or a digital versatile disc (DVD). A processor in association with software may be used to implement a radio frequency transceiver for use in a WTRU, UE, terminal, base station, Node-B, eNB, HNB, HeNB, AP, RNC, wireless router or any host computer.

What is claimed:

1. A method, performed by a node in a core network, of negotiating keep-alive message frequencies with application servers associated with respective applications, the method comprising:
the node sending mobile-originated (MO) keep-alive message frequency negotiation request messages to a plurality of application servers to negotiate frequencies of keep-alive messages sent by applications running on a wireless transmit/receive unit (WTRU) and associated with the application servers, wherein each of the MO keep-alive message frequency negotiation request messages includes a message identifier field, a WTRU identifier field, and a field indicating a number of applications;
the node receiving MO keep-alive message frequency negotiation response messages from the application servers; and
the node sending a message to the WTRU, the message requesting the WTRU to send a keep-alive message at a frequency lower than a negotiated frequency and indicating how long the keep-alive message is valid for.

2. The method of claim 1 wherein the node is one of a packet data network gateway, a negotiation and caching gateway, or a serving gateway.

3. The method of claim 1 wherein the node includes a buffer configured to classify application messages targeted to the WTRU into different types with priorities or weights.

4. The method of claim 1 wherein all of the application servers agree to a common MO keep-alive message frequency, and the applications send the keep-alive messages at the agreed MO keep-alive message frequency.

5. The method of claim 1 wherein each of the MO keep-alive message frequency negotiation request messages further includes a plurality of application identifier fields, a plurality of keep-alive message frequency fields and a proposed frequency field.

6. The method of claim 1 wherein each of the MO keep-alive message frequency negotiation response messages includes a message identifier field, at least one application identifier field, at least one keep-alive message frequency field, and a field indicating a proposed frequency range.

7. The method of claim 6 wherein each of the MO keep-alive message frequency negotiation response messages further includes a code field indicating whether an application frequency is valid or not valid.

8. The method of claim 1 wherein the node further includes a buffer configured to buffer keep-alive messages and status update messages sent by the application servers to the WTRU.

9. The method of claim 1 further comprising:
the node sending MO keep-alive message frequency negotiation confirmation messages to the application servers indicating an agreed frequency.

10. A method, performed by a node in a core network, of negotiating keep-alive message frequencies, the method comprising:
the node performing a comparison of a new frequency of keep-alive messages sent by a new application, initiated to begin running on a wireless transmit/receive unit (WTRU), to a common frequency of keep-alive messages sent by a group of applications currently running on the WTRU; and
determining whether to add the new application to the group of applications or to establish a first application group associated with the common keep-alive message frequency and a second application group associated with the new application keep-alive message frequency.

11. The method of claim 10 wherein the node is one of a packet data network gateway, a negotiation and caching gateway, or a serving gateway.

12. The method of claim 10 wherein the node includes a buffer configured to classify application messages targeted to the WTRU into different types with priorities or weights.

13. The method of claim 10 wherein the node is configured to send a message to the WTRU, the message requesting the WTRU to send a keep-alive message at a frequency lower than a negotiated frequency and indicating how long the keep-alive message is valid for.

14. The method of claim 10 further comprising:
the node sending mobile-originated (MO) keep-alive message frequency negotiation request messages, including a proposed frequency field indicating the new keep-alive message frequency, to a plurality of application servers supporting the group of applications currently running on the WTRU; and
the node sending an MO keep-alive message frequency negotiation request message including a proposed frequency field indicating the common keep-alive message frequency to an application server supporting the new application, on a condition that all of the application servers supporting the group of applications currently running on the WTRU did not agree to the new keep-alive message frequency.

15. A node comprising:
an antenna operatively coupled to at least one circuit;
the at least one circuit configured to send mobile-originated (MO) keep-alive message frequency negotiation request messages to a plurality of application servers to negotiate frequencies of keep-alive messages sent by applications running on a wireless transmit/receive unit (WTRU) and associated with the application servers, wherein each of the MO keep-alive message frequency negotiation request messages includes a message identifier field, a WTRU identifier field, and a field indicating a number of applications;
the at least one circuit configured to receive MO keep-alive message frequency negotiation response messages from the application servers; and
the at least one circuit configured to send a message to the WTRU, the message requesting the WTRU to send a keep-alive message at a frequency lower than a negotiated frequency and indicating how long the keep-alive message is valid for.

16. The node of claim 15 wherein the node is one of a packet data network gateway, a negotiation and caching gateway, or a serving gateway.

17. The node of claim 15 wherein the node includes a buffer configured to classify application messages targeted to the WTRU into different types with priorities or weights.

18. The node of claim 15 wherein each of the MO keep-alive message frequency negotiation request messages further includes a plurality of application identifier fields, a plurality of keep-alive message frequency fields and a proposed frequency field.

19. The node of claim 15 wherein each of the MO keep-alive message frequency negotiation response messages includes a message identifier field, at least one application identifier field, at least one keep-alive message frequency field, and a field indicating a proposed frequency range.

* * * * *